(12) United States Patent
Aoki et al.

(10) Patent No.: US 10,697,923 B2
(45) Date of Patent: Jun. 30, 2020

(54) CONTROL DEVICE OF NITROGEN OXIDE SENSOR

(71) Applicant: TOYOTA JIDOSHA KABUSHIKI KAISHA, Toyota-shi, Aichi-ken (JP)

(72) Inventors: Keiichiro Aoki, Shizuoka-ken (JP); Yoshihisa Serizawa, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 463 days.

(21) Appl. No.: 15/499,994

(22) Filed: Apr. 28, 2017

(65) Prior Publication Data

US 2017/0315080 A1 Nov. 2, 2017

(30) Foreign Application Priority Data

May 2, 2016 (JP) .................. 2016-092673

(51) Int. Cl.
*G01N 27/406* (2006.01)
*F01N 11/00* (2006.01)
*G01N 27/407* (2006.01)

(52) U.S. Cl.
CPC ....... *G01N 27/4065* (2013.01); *F01N 11/005* (2013.01); *F01N 11/007* (2013.01); *G01N 27/4067* (2013.01); *G01N 27/4075* (2013.01); *F01N 2560/026* (2013.01); *F01N 2560/12* (2013.01); *F01N 2560/20* (2013.01); *F01N 2900/0416* (2013.01); *G01N 27/4074* (2013.01); *Y02T 10/47* (2013.01)

(58) Field of Classification Search
CPC .................. F01N 11/005; F01N 11/007; F01N 2900/0416; F01N 2560/12; F01N 2560/026; F01N 2560/20; F01N 9/005; F01N 2390/02; F01N 2900/0601; F01N 2900/1404; Y02T 10/47; G01N 27/406–41; B60W 2710/0694; B60W 2510/068

See application file for complete search history.

(56) References Cited

U.S. PATENT DOCUMENTS

| 6,036,841 A | 3/2000 | Kato et al. |
| 2009/0205957 A1* | 8/2009 | Hada .................. G01N 27/4065 204/406 |
| 2017/0219516 A1* | 8/2017 | Toudou .............. G01N 27/4067 |

FOREIGN PATENT DOCUMENTS

JP  H10-38845 A  2/1998

* cited by examiner

*Primary Examiner* — J. Christopher Ball
(74) *Attorney, Agent, or Firm* — Hunton Andrews Kurth LLP

(57) ABSTRACT

A control device of a nitrogen oxide sensor comprises a voltage control part configured to control voltage applied to the pump cell, and a temperature estimation part configured to estimate a temperature of the pump cell. The voltage control part is configured to make the voltage applied to the pump cell a voltage of a starting voltage of decomposition of water or more when the estimated temperature of the pump cell estimated by the temperature estimation part is within a predetermined temperature region of less than an activation temperature of the pump cell as control suppressing evaporation.

9 Claims, 13 Drawing Sheets

FIG. 1
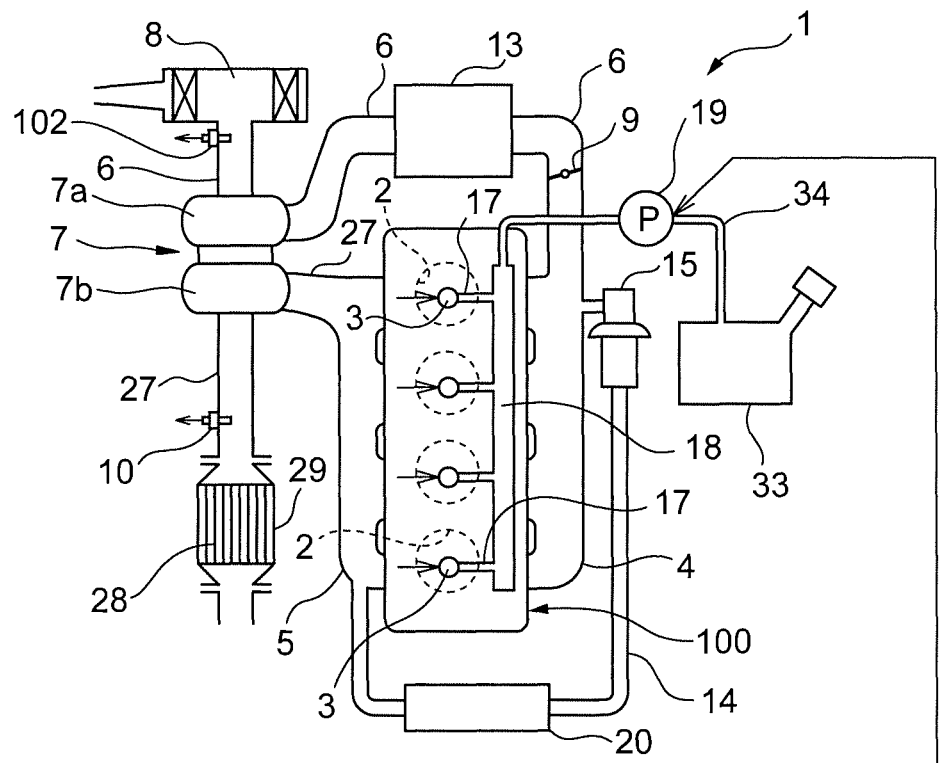
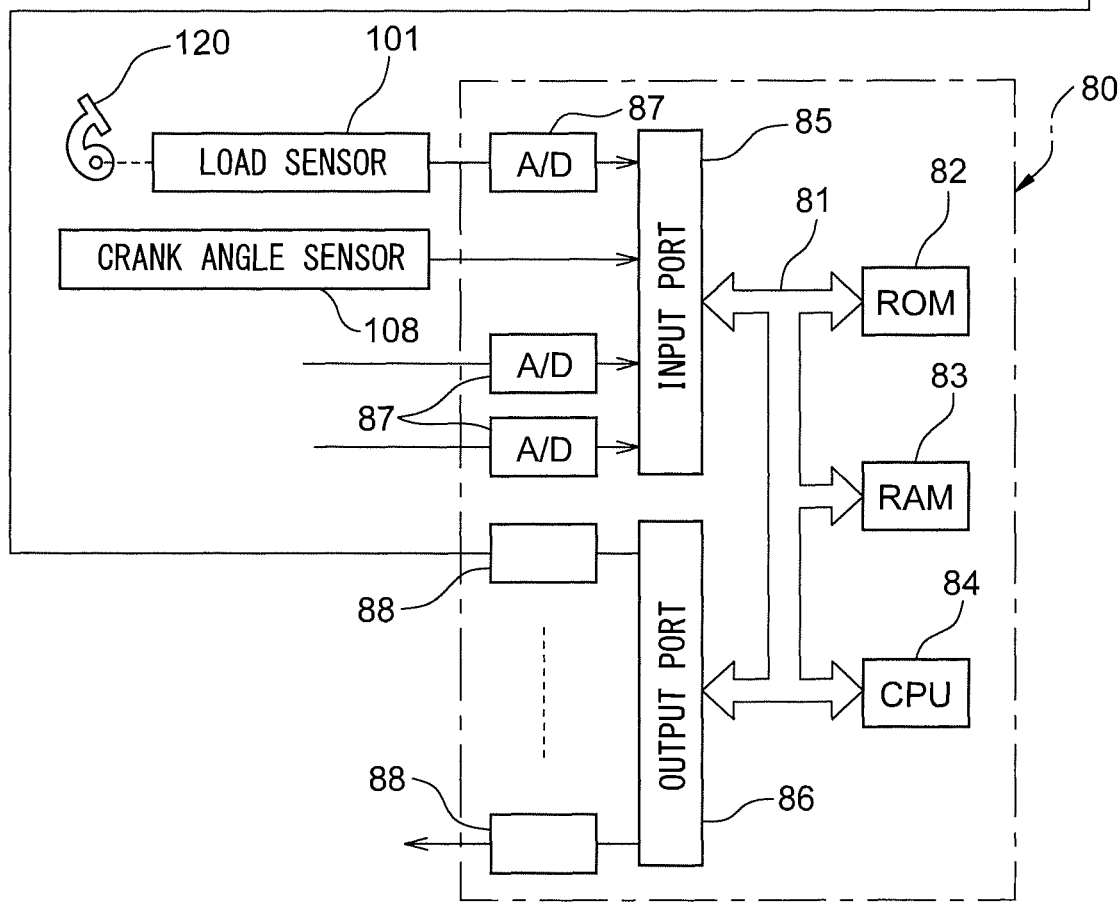

CONTROL DEVICE OF NITROGEN OXIDE SENSOR

CROSS-REFERENCE TO RELATED APPLICATION

The present application claims priority to Japanese Patent Application No. 2016-092673 filed on May 2, 2016, which is incorporated herein by reference in its entirety.

TECHNICAL FIELD

The present invention relates to a control device of a nitrogen oxide sensor.

BACKGROUND ART

It has been known in the past to arrange a nitrogen oxide sensor ($NO_X$ sensor) in an exhaust passage of an internal combustion engine so as to detect a concentration of nitrogen oxide ($NO_X$) in exhaust gas flowing through the exhaust passage of the internal combustion engine.

As described in PLT 1, an $NO_X$ sensor is provided with a measured gas chamber into which exhaust gas is introduced as measured gas, a pump cell discharging oxygen in the measured gas, and a sensor cell detecting a concentration of $NO_X$ in the measured gas. A negative electrode of the pump cell is comprised of a platinum-gold alloy (Pt—Au alloy) having an oxygen decomposition function and not having an $NO_X$ decomposition function. On the other hand, a negative electrode of the sensor cell is comprised of a platinum-rhodium alloy (Pt—Rh alloy) having an $NO_X$ decomposition function.

Further, the $NO_X$ sensor is also provided with a heater for heating the sensor cell and pump cell. The heater heats the sensor cell and pump cell to the activation temperatures or more so as to secure the precision of detection of the $NO_X$ concentration by the $NO_X$ sensor. However, if the temperature of the pump cell becomes excessively high, gold (Au) will evaporate from the negative electrode of the pump cell. The evaporated Au will deposit on the negative electrode of the sensor cell and cause the output of the sensor cell to permanently drop. For this reason, while the $NO_X$ sensor detects the concentration of $NO_X$ in the exhaust gas, the temperature of the pump cell is controlled to a predetermined control temperature (for example 750° C. to 800° C.)

CITATION LIST

Patent Literature

PLT 1: Japanese Patent Publication No. 10-038845A

SUMMARY OF INVENTION

Technical Problem

However, even if the temperature of the pump cell is controlled by a heater, sometimes the temperature of the pump cell would temporarily become less than the activation temperature. For example, if the voltage of a battery of the vehicle mounting the internal combustion engine fell, it would not be possible to apply the required voltage to the heater and the temperature of the pump cell would become less than the activation temperature. Further, in an internal combustion engine, when fuel cut control stopping the supply of fuel to a combustion chamber is performed, the air flowing through the exhaust passage causes the temperature of the pump cell to become less than the activation temperature. The inventors of the present application discovered that when the temperature of the pump cell is in a predetermined temperature region less than the activation temperature, evaporation of Au from the pump cell causes the output of the sensor cell to fall.

Therefore, an object of the present invention is to provide a control device of a nitrogen oxide sensor able to suppress a drop in output of a sensor cell due to evaporation of Au from a pump cell.

Solution to Problem

In order to solve the above problem, in a first aspect, there is provided a control device of a nitrogen oxide sensor controlling a nitrogen oxide sensor arranged in an exhaust passage of an internal combustion engine and detecting a concentration of nitrogen oxide in exhaust gas, wherein the nitrogen oxide sensor comprises a measured gas chamber in which the exhaust gas is introduced as measured gas, a sensor cell having a sensor-use solid electrolyte layer having an oxide ion conductivity, a first electrode arranged on one side surface of the sensor-use solid electrolyte layer so as to be exposed to the measured gas, and a second electrode arranged at the other side surface of the sensor-use solid electrolyte layer so as to be exposed to a reference gas, a pump cell having a pump-use solid electrolyte layer having an oxide ion conductivity, a third electrode arranged at one side surface of the pump-use solid electrolyte layer so as to be exposed to the measured gas and comprised of a platinum-gold alloy, and a fourth electrode arranged at the other side surface of the pump-use solid electrolyte layer so as to be exposed to the reference gas, and arranged at an upstream side from the sensor cell in a direction of flow of the measured gas, a voltage application circuit applying voltage to the pump cell so that a potential of the fourth electrode becomes higher than a potential of the third electrode, and a heater heating the sensor cell and the pump cell, the control device comprises a voltage control part configured to control voltage applied to the pump cell, and a temperature estimation part configured to estimate a temperature of the pump cell, and the voltage control part is configured to make the voltage applied to the pump cell a voltage of a starting voltage of decomposition of water or more when the estimated temperature of the pump cell estimated by the temperature estimation part is within a predetermined temperature region of less than an activation temperature of the pump cell as control suppressing evaporation.

In a second aspect, the voltage control part is configured to make the voltage applied to the pump cell a voltage of within a limit current region of oxygen and less than the starting voltage of decomposition of water when the estimated temperature of the pump cell is the activation temperature or more, in the first aspect.

In a third aspect, the control device further comprises a heater control part configured to control the heater, the heater control part is configured to raise the temperature of the pump cell to the activation temperature or more after startup of the internal combustion engine as warmup control, and the voltage control part is configured not to perform the control suppressing evaporation and to make the voltage applied to the pump cell a voltage less than the starting voltage of decomposition of water or not to apply voltage to the pump cell until the warmup control causes the estimated temperature of the pump cell to first reach the activation temperature or more, even if the estimated temperature of the pump cell is within the predetermined temperature region, in the first or second aspect.

In a forth aspect, the control device further comprises an air-fuel ratio estimation part configured to estimate the air-fuel ratio of the measured gas, and the voltage control part is configured to start the control suppressing evaporation when the estimated temperature of the pump cell is within the predetermined temperature region and the air-fuel ratio of the measured gas estimated by the air-fuel ratio estimation part is leaner than a stoichiometric air-fuel ratio, in any one of the first to third aspects.

In a fifth aspect, the air-fuel ratio estimation part is configured to estimate the air-fuel ratio of the measured gas based on an output of the pump cell, and the voltage control part is configured to end the control suppressing evaporation when the estimated temperature of the pump cell reaches a temperature outside the predetermined temperature region, in the fourth aspect.

In a sixth aspect, the voltage control part is configured to perform the control suppressing evaporation when in the internal combustion engine, supply of fuel to a combustion chamber is stopped as fuel cut control or the engine is idling, in any one of the first to fifth aspects.

In a seventh aspect, the voltage control part is configured to perform the control suppressing evaporation after stopping of the internal combustion engine is requested, in any one of the first to sixth aspects.

In an eighth aspect, the voltage control part is configured to end the application of voltage to the pump cell when the estimated temperature of the pump cell reaches a temperature less than the predetermined temperature region, in any one of the first to seventh aspects.

Advantageous Effects of Invention

According to the present invention, there is provided a control device of a nitrogen oxide sensor able to suppress a drop in output of a sensor cell due to evaporation of Au from a pump cell.

BRIEF DESCRIPTION OF DRAWINGS

FIG. 1 is a view schematically showing an internal combustion engine in which a control device of a nitrogen oxide sensor according to a first embodiment of the present invention is used.

DESCRIPTION OF EMBODIMENTS

Figure 2:
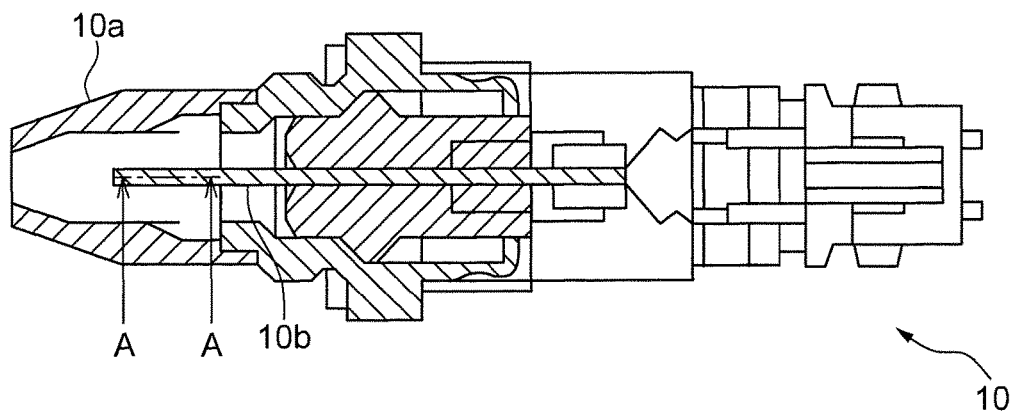
FIG. 2 is an enlarged cross-sectional view of an $NO_X$ sensor.

Below, referring to the drawings, embodiments of the present invention will be explained in detail. Note that, in the following explanation, similar components will be assigned the same reference notations.

First Embodiment

Below, referring to FIG. 1 to FIG. 10, a first embodiment of the present invention will be explained.

<Explanation of Internal Combustion Engine as Whole>

FIG. 1 is a view schematically showing an internal combustion engine 1 in which a control device of a nitrogen oxide ($NO_X$) sensor according to the first embodiment of the present invention is used. The internal combustion engine 1 shown in FIG. 1 is a compression ignition type internal combustion engine (diesel engine). The internal combustion engine 1 is for example mounted in a vehicle.

Referring to FIG. 1, the internal combustion engine 1 is provided with an engine body 100, a combustion chamber 2 of each cylinder, an electronically controlled fuel injector 3 injecting fuel into each combustion chamber 2, an intake manifold 4, and an exhaust manifold 5. The intake manifold 4 is connected through an intake pipe 6 to an outlet of a compressor 7a of a turbocharger 7. The inlet of the compressor 7a is connected through the intake pipe 6 to an air cleaner 8. Inside the intake pipe 6, a throttle valve 9 driven by a step motor is arranged. Furthermore, around the intake pipe 6, a cooling device 13 for cooling the intake air flowing through the inside of the intake pipe 6 is arranged. In the internal combustion engine 1 shown in FIG. 1, engine cooling water is guided to the inside of the cooling device 13 and cools the intake air. The intake manifold 4 and intake pipe 6 form an intake passage guiding air to the inside of each combustion chamber 2.

On the other hand, the exhaust manifold 5 is connected through an exhaust pipe 27 to an inlet of a turbine 7b of the turbocharger 7. The outlet of the turbine 7b is connected through the exhaust pipe 27 to a casing 29 housing an exhaust purification catalyst 28. The exhaust manifold 5 and exhaust pipe 27 form an exhaust passage discharging exhaust gas generated by combustion of the air-fuel mixture in each combustion chamber 2. The exhaust purification catalyst 28 is, for example, a selective catalytic reduction type $NO_X$ reduction catalyst (SCR catalyst) or an $NO_X$ storage and reduction catalyst for removing the $NO_X$ in the exhaust gas by reduction. Further, inside the exhaust passage, to reduce particulate matter (PM) in the exhaust gas, an oxidation catalyst, diesel particulate filter (DPF), etc. may be arranged.

The exhaust manifold 5 and the intake manifold 4 are connected through an exhaust gas recirculation (below, referred to as "EGR") passage 14. Inside the EGR passage 14, an electronically controlled EGR control valve 15 is arranged. Further, around the EGR passage 14, an EGR cooling device 20 is arranged for cooling the EGR gas flowing through the inside of the EGR passage 14. In the embodiment shown in FIG. 1, the engine cooling water is guided to the inside of the EGR cooling device 20 and cools the EGR gas.

The fuel is supplied by an electronically controlled variable discharge fuel pump 19 from a fuel tank 33 through a fuel pipe 34 to the inside of a common rail 18. The fuel supplied to the inside of the common rail 18 is supplied through the individual fuel supply pipes 17 to the individual fuel injectors 3.

The various control routines of the internal combustion engine 1 are performed by the electronic control unit (ECU) 80. The ECU 80 is comprised of a digital computer provided with components connected to each other through a bidirectional bus 81 such as a ROM (read only memory) 82, RAM (random access memory) 83, CPU (microprocessor) 84, input port 85, and output port 86. Outputs of a load sensor 101 and an air-flow meter 102 are input through corresponding AD converters 87 to the input port 85. On the other hand, the output port 86 is connected through corresponding drive circuits 88 to the fuel injectors 3, throttle valve drive step motor, EGR control valve 15, and fuel pump 19.

The load sensor 101 generates an output voltage proportional to an amount of depression of an accelerator pedal 120. Therefore, the load sensor 101 detects the engine load. The air-flow meter 102 is arranged inside the intake passage between the air cleaner 8 and compressor 7a and detects the amount of air flowing through the inside of the intake pipe 6. Furthermore, a crank angle sensor 108 generating an output pulse every time the crankshaft rotates by for example 15° is connected to the input port 85. The crank angle sensor 108 is used to detect the engine speed.

Note that, the internal combustion engine 1 may be a spark ignition type internal combustion engine with spark plugs arranged in the combustion chambers. Further, specific configurations of the internal combustion engine 1 such as the cylinder array, configuration of the intake and exhaust systems, and presence or absence of a turbocharger may differ from the configuration shown in FIG. 1.

<Explanation of $NO_X$ Sensor>

In the exhaust passage of the internal combustion engine 1, a nitrogen oxide ($NO_X$) sensor 10 is further arranged. The $NO_X$ sensor 10 detects the concentration of nitrogen oxide ($NO_X$) in the exhaust gas flowing through the exhaust passage of the internal combustion engine 1. The $NO_X$ sensor 10 is a limit current type $NO_X$ sensor which calculates the concentration of the $NO_X$ in the exhaust gas by detecting a limit current flowing through the inside of the sensor when applying a predetermined voltage. In the present embodiment, the $NO_X$ sensor 10 is arranged in the exhaust passage at the upstream side from the exhaust purification catalyst 28 in the direction of flow of exhaust. Note that, the $NO_X$ sensor 10 may be arranged at another position of the exhaust passage, for example, at the downstream side of the exhaust purification catalyst 28 in the direction of flow of exhaust.

Below, referring to FIG. 2 and FIG. 3, the configuration of the $NO_X$ sensor 10 will be explained. FIG. 2 is an enlarged cross-sectional view of the $NO_X$ sensor 10. In FIG. 2, a part of the $NO_X$ sensor 10 is shown by a cross-sectional view. The $NO_X$ sensor 10 is fastened in the exhaust pipe 27 in the state with a front end part 10a inserted in the exhaust pipe 27. The $NO_X$ sensor 10 is provided with an element part 10b having a plate-like shape at the inside.

Figure 3:
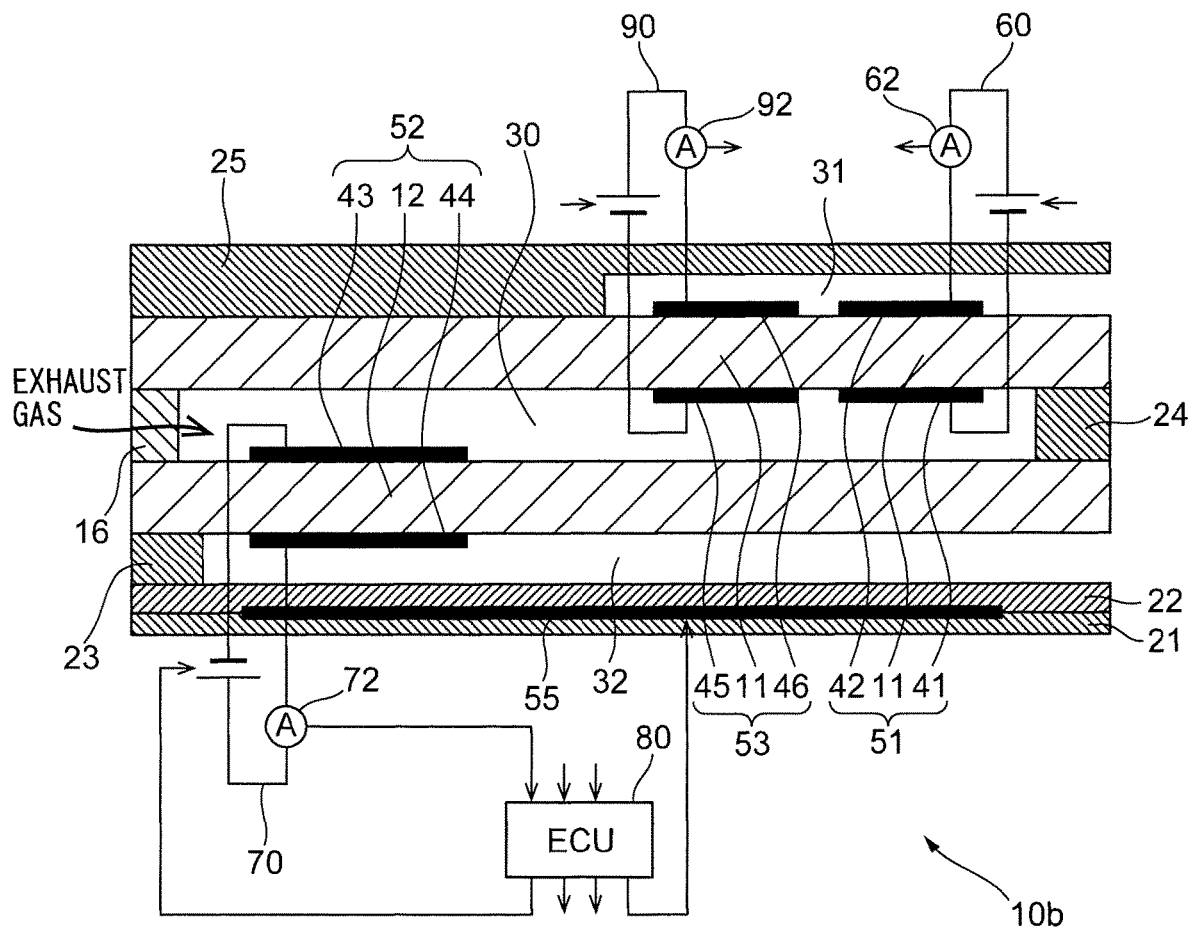
FIG. 3 is a cross-sectional view of an $NO_X$ sensor along the line A-A of FIG. 2.

FIG. 3 is a cross-sectional view of the $NO_X$ sensor 10 along the line A-A of FIG. 2. As shown in FIG. 3, the element part 10b of the $NO_X$ sensor 10 is provided with a measured gas chamber 30, first reference gas chamber 31, second reference gas chamber 32, sensor cell 51, pump cell 52, and monitor cell 53. When the $NO_X$ sensor 10 is arranged in the exhaust passage of the internal combustion engine 1, the exhaust gas flowing through the exhaust passage is introduced into the measured gas chamber 30 as the measured gas. Reference gas is introduced into the first reference gas chamber 31 and the second reference gas chamber 32. The reference gas is for example air. In this case, the first reference gas chamber 31 and the second reference gas chamber 32 are open to the atmosphere.

The element part 10b is comprised of a plurality of layers superposed. Specifically, the element part 10b is provided with a first solid electrolyte layer 11, second solid electrolyte layer 12, diffusion regulating layer 16, first barrier layer 21, second barrier layer 22, third barrier layer 23, fourth barrier layer 24, and fifth barrier layer 25. The first solid electrolyte layer 11 and the second solid electrolyte layer 12 are thin plate members having oxide ion conductivity. The first solid electrolyte layer 11 and the second solid electrolyte layer 12 are, for example, formed by sintered bodies of $ZrO_2$ (zirconia), $HfO_2$, $ThO_2$, $Bi_2O_3$, etc. to which CaO, MgO, $Y_2O_3$, $Yb_2O_3$, etc. is added as a stabilizer. Further, the diffusion regulating layer 16 is a thin plate member having gas permeability. The diffusion regulating layer 16 is, for example, formed by a porous sintered body of alumina, magnesia, silica, spinel, mullite, or other heat resistant inorganic substance. The barrier layers 21 to 25 are gas impermeable thin plate members and, for example, are formed as layers containing alumina.

The layers of the element part 10b are comprised of, from the bottom of FIG. 3, the first barrier layer 21, second barrier layer 22, third barrier layer 23, second solid electrolyte layer 12, diffusion regulating layer 16 and fourth barrier layer 24, first solid electrolyte layer 11, and fifth barrier layer 25 stacked in that order. The measured gas chamber 30 is formed and defined by the first solid electrolyte layer 11, second solid electrolyte layer 12, diffusion regulating layer 16, and fourth barrier layer 24. The exhaust gas passes through the diffusion regulating layer 16 and is introduced to the inside of the measured gas chamber 30. The diffusion regulating layer 16 regulates the diffusion of the measured gas. Note that, the measured gas chamber 30 may be configured in any form so long as adjoining the solid electrolyte layer (in the present embodiment, the first solid electrolyte layer 11 and the second solid electrolyte layer 12) and having the measured gas introduced into it.

The first reference gas chamber 31 is formed and defined by the first solid electrolyte layer 11 and the fifth barrier layer 25. The second reference gas chamber 32 is formed and defined by the second solid electrolyte layer 12, second barrier layer 22, and third barrier layer 23. Note that, the first reference gas chamber 31 may be configured in any form so long as adjoining the solid electrolyte layer (in the present embodiment, the first solid electrolyte layer 11) and having the reference gas flowing into it. Further, the second reference gas chamber 32 may be configured in any form so long as adjoining the solid electrolyte layer (in the present embodiment, the second solid electrolyte layer 12) and having the reference gas flowing into it.

The sensor cell 51 is an electrochemical cell having a sensor-use solid electrolyte layer, first electrode 41, and second electrode 42. In the present embodiment, the first solid electrolyte layer 11 functions as the sensor-use solid electrolyte layer. The first electrode 41 is arranged on the surface of the first solid electrolyte layer 11 on the measured gas chamber 30 side so that it is exposed to the measured gas in the measured gas chamber 30. On the other hand, the second electrode 42 is arranged on the surface of the first solid electrolyte layer 11 on the first reference gas chamber 31 side so that it is exposed to the reference gas in the first reference gas chamber 31. The first electrode 41 and the second electrode 42 are arranged so as to face each other across the first solid electrolyte layer 11.

In the present embodiment, the first electrode 41 is comprised of a platinum-rhodium alloy (Pt—Rh alloy) having an $NO_X$ decomposition function. For example, the first electrode 41 is a porous cermet electrode containing a Pt—Rh alloy as a main ingredient. However, the material forming the first electrode 41 is not necessarily limited to the above material. It may be any material so long as one able to reduce and decompose the $NO_X$ in the measured gas when applying a predetermined voltage between the first electrode 41 and the second electrode 42.

Further, in the present embodiment, the second electrode 42 is comprised of platinum (Pt). For example, the second electrode 42 is a porous cermet electrode containing Pt as a main ingredient. However, the material forming the second electrode 42 is not necessarily limited to the above material. It may be any material so long as one able to move oxide ions between the first electrode 41 and second electrode 42 when applying a predetermined voltage between the first electrode 41 and the second electrode 42.

The pump cell 52 is an electrochemical cell having a pump-use solid electrolyte layer, third electrode 43, and fourth electrode 44. In the present embodiment, the second solid electrolyte layer 12 functions as a pump-use solid electrolyte layer. The third electrode 43 is arranged on the surface of the second solid electrolyte layer 12 on the measured gas chamber 30 side so that it is exposed to the measured gas in the measured gas chamber 30. On the other hand, the fourth electrode 44 is arranged on the surface of the second solid electrolyte layer 12 on the second reference gas chamber 32 side so that it is exposed to the reference gas in the second reference gas chamber 32. The third electrode 43 and the fourth electrode 44 are arranged so as to face each other across the second solid electrolyte layer 12.

In the present embodiment, the third electrode 43 is comprised of a platinum-gold alloy (Pt—Au alloy) having an oxygen decomposition function and not having an $NO_X$ decomposition function. For example, the third electrode 43 is a porous cermet electrode having Pt—Au alloy as its main ingredient.

Further, in the present embodiment, the fourth electrode 44 is comprised of platinum (Pt). For example, the fourth electrode 44 is a porous cermet electrode containing Pt as a main ingredient. However, the material forming the fourth electrode 44 is not necessarily limited to the above material. It may be any material so long as one able to move oxide ions between the third electrode 43 and fourth electrode 44 when applying a predetermined voltage between the third electrode 43 and the fourth electrode 44.

The monitor cell 53 is an electrochemical cell having a monitor-use solid electrolyte layer, fifth electrode 45, and sixth electrode 46. In the present embodiment, the first solid electrolyte layer 11 functions as the monitor-use solid electrolyte layer. Therefore, in the present embodiment, the sensor-use solid electrolyte layer and monitor-use solid electrolyte layer are formed from a common solid electrolyte layer. The fifth electrode 45 is arranged on the surface of the first solid electrolyte layer 11 on the measured gas chamber 30 side so that it is exposed to the measured gas in the measured gas chamber 30. On the other hand, the sixth electrode 46 is arranged on the surface of the first solid electrolyte layer 11 on the first reference gas chamber 31 side so that it is exposed to the reference gas in the first reference gas chamber 31. The fifth electrode 45 and the sixth electrode 46 are arranged so as to face each other across the first solid electrolyte layer 11.

In the present embodiment, the fifth electrode 45 is comprised of a platinum-gold alloy (Pt—Au alloy) having an oxygen decomposition function and not having an $NO_X$ decomposition function. For example, the fifth electrode 45 is a porous cermet electrode having Pt—Au alloy as its main ingredient.

Further, in the present embodiment, the sixth electrode 46 is comprised of platinum (Pt). For example, the sixth electrode 46 is a porous cermet electrode containing Pt as a main ingredient. However, the material forming the sixth electrode 46 is not necessarily limited to the above material. It may be any material so long as one able to move oxide ions between the fifth electrode 45 and sixth electrode 46 when applying a predetermined voltage between the fifth electrode 45 and sixth electrode 46.

As shown in FIG. 3, the pump cell 52 is arranged at the upstream side from the sensor cell 51 in the direction of flow of the measured gas. The monitor cell 53 is arranged between the pump cell 52 and sensor cell 51 in the direction of flow of the measured gas. Further, the third electrode 43 and the fourth electrode 44 of the pump cell 52 have surface areas larger than the first electrode 41 and second electrode 42 of the sensor cell and the fifth electrode 45 and the sixth electrode 46 of the monitor cell 53.

The element part 10b is further provided with a heater 55. In the present embodiment, the heater 55, as shown in FIG. 3, is arranged between the first barrier layer 21 and the second barrier layer 22. The heater 55 is, for example, a thin plate member of cermet including platinum (Pt) and a ceramic (for example, alumina etc.), and is a heat generating element generating heat by passage of current. The heater 55 heats the element part 10b, in particular the sensor cell 51, pump cell 52, and monitor cell 53. The heater 55 is connected to the ECU 80 and is controlled by the ECU 80.

Note that, the specific configuration of the element part 10b may differ from the configuration shown in FIG. 3. For example, the sensor-use solid electrolyte layer, pump-use solid electrolyte layer, and monitor-use solid electrolyte layer may be formed from a common solid electrolyte layer or may be separate solid electrolyte layers.

The $NO_X$ sensor 10 is further provided with a first voltage application circuit 60, second voltage application circuit 70, third voltage application circuit 90, first ammeter 62, second ammeter 72, and third ammeter 92. The first voltage application circuit 60 applies voltage to the sensor cell 51 so that the potential of the second electrode 42 becomes higher than the potential of the first electrode 41. The second voltage application circuit 70 applies voltage to the pump cell 52 so that the potential of the fourth electrode 44 becomes higher than the potential of the third electrode 43. The third voltage application circuit 90 applies voltage to the monitor cell 53 so that the potential of the sixth electrode 46 becomes higher than the potential of the fifth electrode 45. The first voltage application circuit 60, second voltage application circuit 70, and third voltage application circuit 90 are connected to the ECU 80 and are controlled by the ECU 80.

The first ammeter 62 detects the current flowing through the sensor cell 51 (that is, the current flowing through the inside of the first solid electrolyte layer 11 between the first electrode 41 and the second electrode 42) as the output of the sensor cell 51. The second ammeter 72 detects the current flowing through the pump cell 52 (that is, the current flowing through the inside of the second solid electrolyte layer 12 between the third electrode 43 and the fourth electrode 44) as the output of the pump cell 52. The third ammeter 92 detects the current flowing through the monitor cell 53 (that is, the current flowing through the inside of the first solid electrolyte layer 11 between the fifth electrode 45 and the sixth electrode 46) as the output of the monitor cell 53. The first ammeter 62, second ammeter 72, and third ammeter 92 are connected to the ECU 80. The ECU 80 acquires the output of the sensor cell 51 from the first ammeter 62, acquires the output of the pump cell 52 from the second ammeter 72, and acquires the output of the monitor cell 53 from the third ammeter 92.

<Principle of Detection of $NO_X$ Concentration>

Below, the principle of detecting the concentration of $NO_X$ in the exhaust gas using the $NO_X$ sensor 10 will be explained. As explained above, the exhaust gas flowing through the exhaust passage of the internal combustion engine 1 passes through the diffusion regulating layer 16 and is introduced to the inside of the measured gas chamber 30 as the measured gas. The measured gas introduced to the inside of the measured gas chamber 30 first reaches the pump cell 52.

The measured gas (exhaust gas) includes not only $NO_X$ (NO and $NO_2$), but also oxygen. The first electrode 41 of the sensor cell 51 also decomposes oxygen, so if the concentration of oxygen in the measured gas fluctuates, the output of the sensor cell 51 will also fluctuate and the precision of detection of the $NO_X$ concentration will fall. For this reason, to make the concentration of oxygen in the measured gas reaching the sensor cell 51 constant, the pump cell 52 is used to discharge the oxygen in the measured gas to the second reference gas chamber 32.

A predetermined voltage is applied to the pump cell 52 from the second voltage application circuit 70. As a result, the oxygen in the measured gas is decomposed by reduction at the third electrode 43 and becomes oxide ions. The oxide ions move through the pump-use solid electrolyte layer (in the present embodiment, the second solid electrolyte layer 12) from the third electrode (negative electrode) 43 to the fourth electrode (positive electrode) 44 and are discharged into the second reference gas chamber 32. Therefore, the pump cell 52 can discharge the oxygen in the measured gas to the second reference gas chamber 32. Further, in the pump cell 52, current corresponding to the concentration of oxygen in the measured gas flows. For this reason, by using the second ammeter 72 to detect the output of the pump cell 52, the concentration of oxygen in the measured gas and in turn the air-fuel ratio of the measured gas can also be detected. Note that, the "air-fuel ratio of the measured gas" means the ratio of the mass of air to the mass of fuel supplied until the measured gas is generated (mass of air/mass of fuel) and is estimated from the concentration of oxygen in the measured gas.

Further, as explained above, if using the pump cell 52 to sufficiently decrease the concentration of oxygen in the measured gas, the reaction ($2NO_2 \rightarrow 2NO+O_2$) is caused and the $NO_2$ in the exhaust gas is reduced to NO. Therefore, before the measured gas reaches the sensor cell 51, the $NO_X$ in the measured gas is made the single gas of NO.

The measured gas passing through the pump cell 52 next reaches the monitor cell 53. The monitor cell 53 decomposes the oxygen in the measured gas and detects the residual oxygen concentration in the measured gas. A predetermined voltage is applied to the monitor cell 53 from the third voltage application circuit 90. As a result, in the monitor cell 53, current corresponding to the concentration of oxygen in the measured gas flows. For this reason, it is possible to use the third ammeter 92 to detect the output of the monitor cell 53 to thereby detect the residual oxygen concentration in the measured gas. The ECU 80 performs feedback control on the voltage applied to the pump cell 52 based on the output of the monitor cell 53 so that the residual oxygen concentration becomes a predetermined low concentration. As a result, the concentration of oxygen in the measured gas reaching the sensor cell 51 is controlled to a constant value.

The measured gas passing through the monitor cell 53 next reaches the sensor cell 51. The sensor cell 51 decomposes the NO in the measured gas to detect the concentration of $NO_X$ in the measured gas. A predetermined voltage is applied to the sensor cell 51 from the first voltage application circuit 60. As a result, the NO in the measured gas is decomposed by reduction in the first electrode 41 to generate oxide ions. The oxide ions move through the sensor-use solid electrolyte layer (in the present embodiment, the first solid electrolyte layer 11) from the first electrode (negative electrode) 41 to the second electrode (positive electrode) 42 and are discharged into the first reference gas chamber 31. Before the measured gas reaches the sensor cell 51, the $NO_2$ in the measured gas is made the single gas of NO. In the sensor cell 51, due to the decomposition of NO, current corresponding to the concentration of $NO_X$ (NO and $NO_2$) in the exhaust gas flows. For this reason, it is possible to detect the output of the sensor cell 51 detected by first ammeter 62 to thereby detect the concentration of $NO_X$ in the exhaust gas.

Note that, when the pump cell 52 can remove almost all of the oxygen in the measured gas or when the pump cell 52 can make the concentration of oxygen in the measured gas a substantially constant low concentration, the monitor cell 53 need not detect the residual oxygen concentration in the measured gas. For this reason, in such a case, the $NO_X$ sensor 10 may not be provided with the monitor cell 53, and the pump cell 52 and sensor cell 51 may be used to detect the concentration of $NO_X$ in the exhaust gas.

<Problem Points of $NO_X$ Sensor>

In the $NO_X$ sensor 10, to secure the precision of detection of the $NO_X$ concentration, it is necessary to make the temperatures of the electrochemical cells the activation temperature or more. However, if the temperature of the pump cell 52 becomes excessively high, gold (Au) evaporates from the third electrode 43 of the pump cell 52. The evaporated Au deposits on the first electrode 41 of the sensor cell 51 and causes the output of the sensor cell 51 to permanently fall. For this reason, at the time of detection of the $NO_X$ concentration, the temperature of the element part 10b of the $NO_X$ sensor 10 is controlled by the heater 55 to a predetermined control temperature (for example 750° C. to 800° C.). As a result, it is possible to secure the precision of detection of the $NO_X$ concentration by the $NO_X$ sensor 10.

However, even if the temperature of the pump cell 52 is controlled by the heater 55, sometimes the temperature of the pump cell 52 temporarily becomes less than the activation temperature. For example, if the voltage of the battery of the vehicle mounting the internal combustion engine 1 falls, it is not possible to apply the required voltage to the heater 55 and the temperature of the pump cell 52 becomes less than the activation temperature. Further, when stopping the supply of fuel to the combustion chamber 2 as fuel cut control in the internal combustion engine 1, the air flowing through the exhaust passage causes the temperature of the pump cell 52 to become less than the activation temperature. The inventors of the present application discovered that when the temperature of the pump cell 52 is within a predetermined temperature region less than the activation temperature, evaporation of Au from the pump cell 52 causes the output of the sensor cell 51 to fall. This phenomenon is believed to be based on the mechanism such as explained below.

Figure 4:
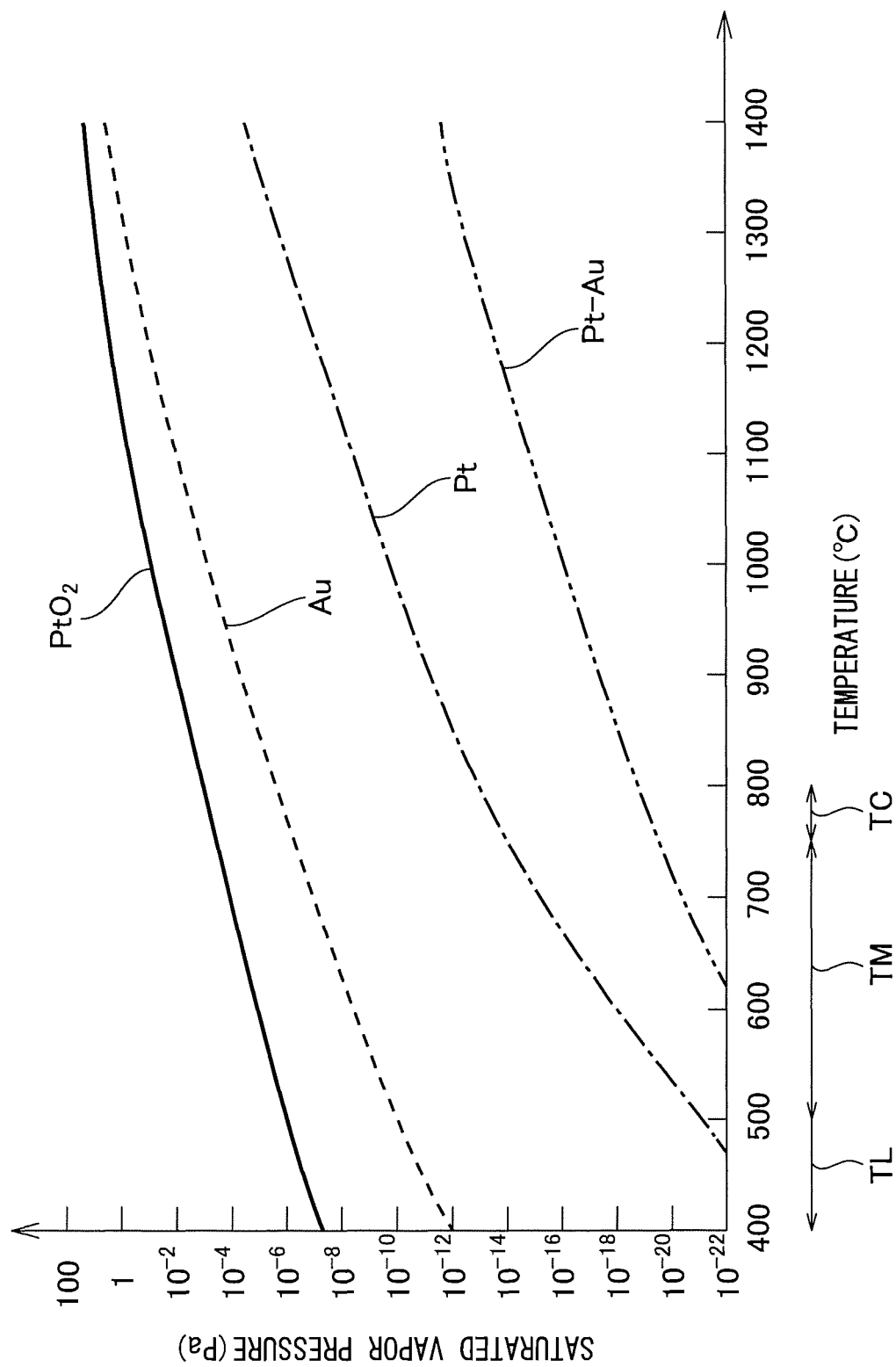
FIG. 4 is a view showing relationships between a saturated vapor pressure and temperature of $PtO_2$, Au, Pt, and a Pt—Au alloy.

FIG. 4 is a view showing the relationships between the saturated vapor pressures and temperature of platinum dioxide ($PtO_2$), gold (Au), platinum (Pt), and a platinum-gold (Pt—Au) alloy. When the temperature of the pump cell 52 is controlled to the control temperature region TC (750° C. to 800° C.), since the oxygen discharge ability of the pump cell 52 is high, at the third electrode 43, almost none of the Pt in the Pt—Au alloy is oxidized. Further, as shown in FIG. 4, if the saturated vapor pressure of the Pt—Au alloy relatively falls, the Pt and Au in the Pt—Au alloy do not evaporate from the third electrode 42 in the control temperature region TC.

On the other hand, if a drop in the battery voltage etc. causes the temperature of the pump cell 52 to become lower than the control temperature region TC, the oxygen discharge ability of the pump cell 52 falls. At this time, if the air-fuel ratio of the measured gas is leaner than the stoichiometric air-fuel ratio (14.6), the third electrode 43 of the pump cell 52 becomes a lean atmosphere. As a result, in the third electrode 43 of the pump cell 52, the Pt inside the Pt—Au alloy is oxidized and $PtO_2$ is generated.

As shown in FIG. 4, the saturated vapor pressure of $PtO_2$ is far higher than the saturated vapor pressures of a Pt—Au alloy and Pt. For this reason, even if the temperature of the pump cell 52 is lower than the control temperature region TC, the $PtO_2$ produced at the third electrode 43 evaporates from the third electrode 43. As a result, the Pt in the Pt—Au alloy evaporates, so in the third electrode 43, Au becomes present in the solitary state. As shown in FIG. 4, the saturated vapor pressure of Au is lower than the saturated vapor pressure of $PtO_2$, but is higher than the saturated vapor pressure of the Pt—Au alloy. For this reason, when the temperature of the pump cell 52 is in a medium temperature region TM (500° C. to 750° C.) lower than the control temperature region TC, Au evaporates from the third electrode 43. Note that, when the temperature of the pump cell 52 is in a low temperature region TL (less than 500° C.) lower than the medium temperature region TM (500° C. to 750° C.), the saturated vapor pressure of Au becomes considerably low, so almost no Au evaporates.

Figure 5:
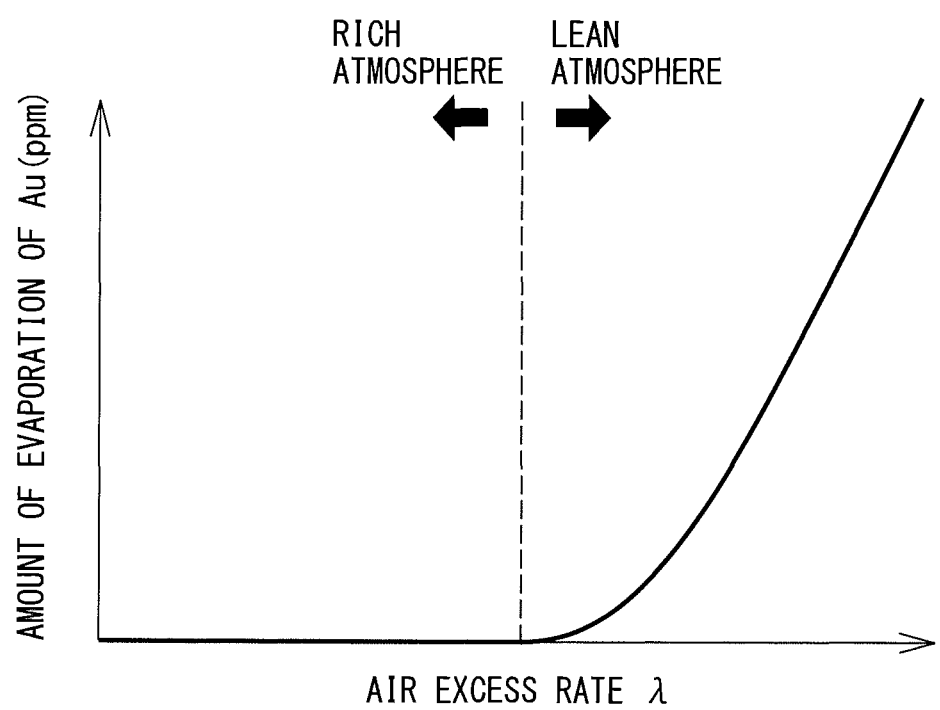
FIG. 5 is a view showing a relationship between an air excess rate of exhaust gas and an amount of evaporation of Au when a temperature of a pump cell is in a medium temperature region.

Therefore, when the temperature of the pump cell 52 is at the medium temperature region TM, if the air-fuel ratio of the measured gas is leaner than the stoichiometric air-fuel ratio, Au evaporates from the third electrode 43. FIG. 5 is a view showing the relationship between the air excess rate λ of the exhaust gas and the amount of evaporation of Au when the temperature of the pump cell 52 is at the medium temperature region TM.

If Au evaporates from the third electrode 43 of the pump cell 52, the evaporated Au will deposit on the first electrode 41 of the sensor cell 51 and the output of the sensor cell 51 will fall. The $NO_X$ concentration is calculated from the output of the sensor cell 51, so if the output of the sensor cell 51 falls, the precision of detection of the concentration of $NO_X$ falls. Specifically, if the output of the sensor cell 51 falls, the $NO_X$ concentration is calculated lower than the actual one. Therefore, to secure the precision of detection of the concentration of $NO_X$ by the $NO_X$ sensor 10, it is necessary to suppress the drop in the output of the sensor cell 51 due to evaporation of Au from the pump cell 52.

<Explanation of Control Device of $NO_X$ Sensor>

Below, the configuration and control of the control device of the $NO_X$ sensor 10 which controls the $NO_X$ sensor 10 so as to suppress the drop in the output of the sensor cell 51 due to the evaporation of Au from the pump cell 52 will be explained.

Figure 6:
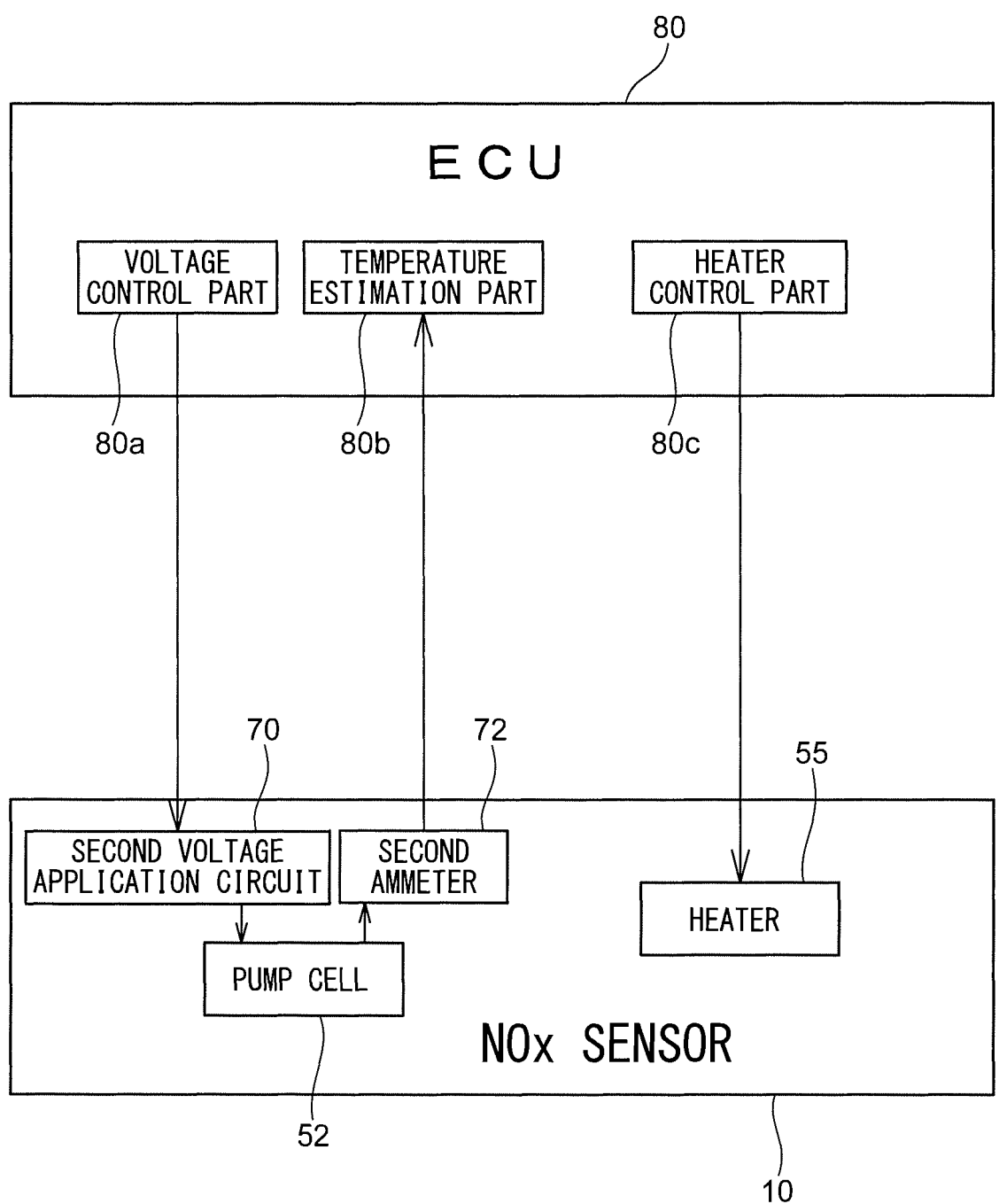
FIG. 6 is a block diagram schematically showing the configuration of a control device of an $NO_X$ sensor and the configuration of an $NO_X$ sensor according to the first embodiment of the present invention.

FIG. 6 is a block diagram schematically showing the configuration of a control device of an $NO_X$ sensor and the configuration of an $NO_X$ sensor according to the first embodiment of the present invention. The control device of the $NO_X$ sensor 10 is provided with a voltage control part 80a, temperature estimation part 80b, and heater control part 80c. In the present embodiment, the voltage control part 80a, temperature estimation part 80b, and heater control part 80c are parts of the ECU 80.

The voltage control part 80a controls the second voltage application circuit 70 to control the voltage applied to the pump cell 52. The temperature estimation part 80b estimates the temperature of the pump cell 52 based on the impedance of the pump cell 52. The impedance of the pump cell 52 is calculated based on the output of the pump cell 52 detected by the second ammeter 72 when a high frequency voltage is applied to the pump cell 52 by the voltage control part 80a. Note that, the temperature of the sensor cell 51 and monitor cell 53 is correlated with the temperature of the pump cell 52, so the temperature estimation part 80b may estimate the temperature of the pump cell 52 based on the impedance of the sensor cell 51 or monitor cell 53.

The heater control part 80c controls the heater 55 of the $NO_X$ sensor 10 to control the temperature of the element part 10b, that is, the temperatures of the sensor cell 51, pump cell 52, and monitor cell 53. Specifically, the heater control part 80c performs feedback control on the voltage applied to the heater 55 so that the temperature of the pump cell 52 estimated by the temperature estimation part 80b becomes the control temperature TC (for example 750° C. to 800° C.)

Figure 7:
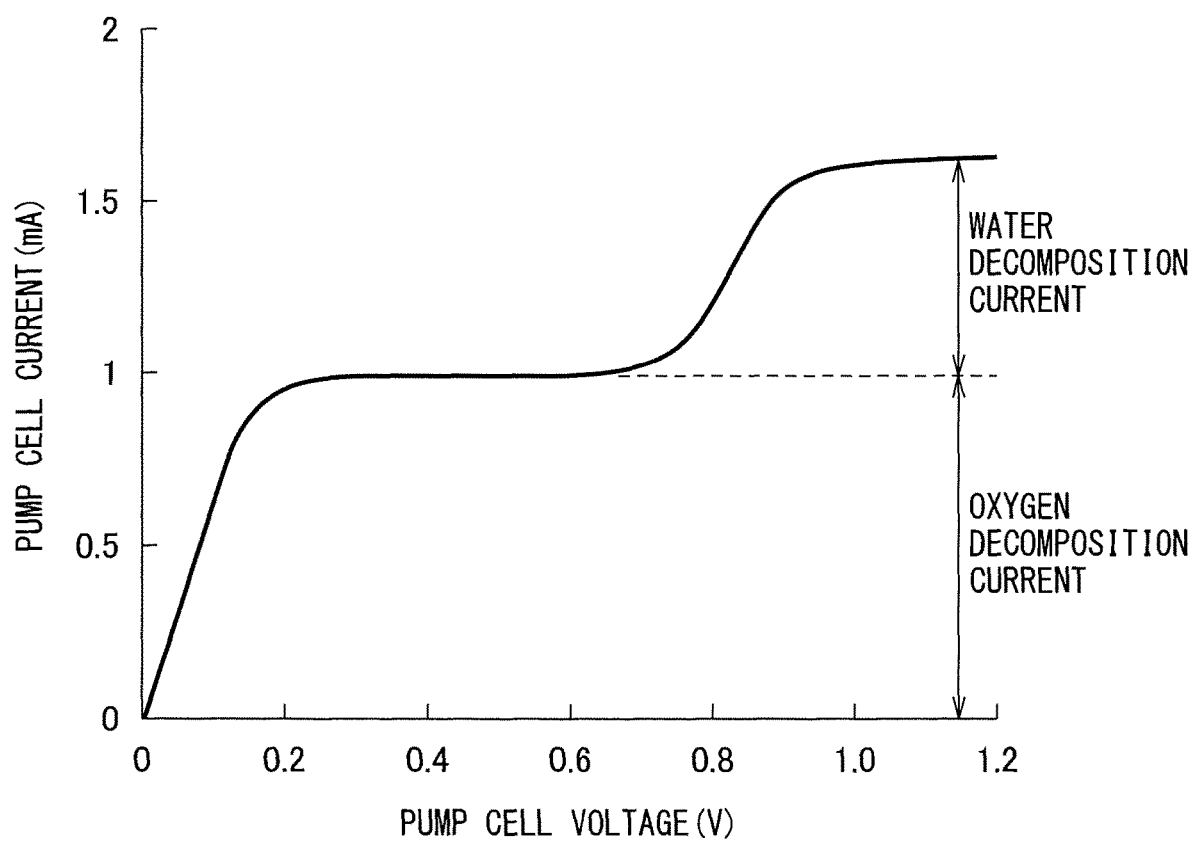
FIG. 7 is a view showing a relationship between voltage applied to the pump cell and current flowing through the pump cell.

FIG. 7 is a view showing the relationship between the voltage applied to the pump cell 52 and the current flowing through the pump cell 52. In the example of FIG. 7, the concentration of oxygen and the concentration of water in the measured gas are respectively 10%. As will be understood from FIG. 7, if the voltage applied to the pump cell 52 becomes a predetermined value (in the illustrated example, about 0.6V) or more, at the third electrode 43 of the pump cell 52, in addition to the oxygen in the measured gas, the hydrogen in the measured gas is decomposed. As a result, the output of the pump cell 52 detected when applying voltage of the starting voltage of decomposition of water or more to the pump cell 52 changes in accordance with not only the concentration of oxygen in the measured gas, but also the concentration of water in the measured gas. In this case, it is difficult to detect the air-fuel ratio of the measured gas based on the output of the pump cell 52.

For this reason, when the estimated temperature of the pump cell 52 estimated by the temperature estimation part

80b is the activation temperature or more, the voltage control part 80a makes the voltage applied to the pump cell 52 a second voltage within the limit current region of oxygen and less than the starting voltage of decomposition of water, in order to discharge the oxygen in the measured gas and detect the air-fuel ratio of the measured gas. The activation temperature is for example 750° C. Note that, the "limit current region of oxygen" means the region where when the concentration of oxygen in the measured gas is constant, even if raising the voltage applied to the pump cell 52, the output current will not become larger. The lower limit voltage of the limit current region of oxygen is about 0.2V, while the starting voltage of decomposition of water is about 0.6V. For this reason, the second voltage is a voltage of 0.2V to less than 0.6V, for example, 0.4V.

If the voltage applied to the pump cell 52 is set to the second voltage, at the pump cell 52, the oxygen in the measured gas is decomposed. The output due to the decomposition of the oxygen is detected from the pump cell 52. For this reason, it is possible to discharge the oxygen in the measured gas and precisely detect the air-fuel ratio of the measured gas (exhaust gas) based on the output of the pump cell 52.

On the other hand, when the estimated temperature of the pump cell 52 is within a predetermined temperature region of less than the activation temperature of the pump cell 52, the voltage control part 80a makes the voltage applied to the pump cell 52 a first voltage of the starting voltage of decomposition of water or more as control suppressing evaporation. The predetermined temperature region is, for example, a medium temperature region TM of 500° C. to less than 750° C. The first voltage is for example a voltage of 0.6V or more. Further, if excessively raising the first voltage, the pump-use solid electrolyte is liable to decompose. For this reason, the first voltage is preferably made a voltage of 0.6V to 2.0V. Further, to promote the decomposition of water, the first voltage is more preferably a voltage of 1.0V to 2.0V, for example, 1.2V.

Due to the control suppressing evaporation, in the third electrode 43 of the pump cell 52, the water in the measured gas is decomposed and hydrogen is produced. At this time, even if the air-fuel ratio of the measured gas is leaner than the stoichiometric air-fuel ratio, the oxygen in the measured gas reacts with the hydrogen produced in the third electrode 43 without reacting with the Pt of the third electrode 43. For this reason, the oxidation of Pt in the Pt—Au alloy at the third electrode 43 can be suppressed. As a result, evaporation of Au from the third electrode 43 is suppressed and in turn a drop in output of the sensor cell 51 is suppressed.

In this regard, to suppress deterioration of the exhaust emission, after startup of the internal combustion engine 1, it is desirable to raise the precision of detection of the air-fuel ratio of the exhaust gas as fast as possible. For this reason, the heater control part 80c raises the temperature of the pump cell 52 of the $NO_X$ sensor 10 to the activation temperature or more after startup of the internal combustion engine 1 as warmup control. Normally, if warmup control is performed, the temperature of the pump cell 52 passes the medium temperature region TM and reaches the activation temperature. However, if control suppressing evaporation is performed during warmup control, due to the effect of the hydrogen produced due to the control suppressing evaporation, even after stopping control suppressing evaporation, the precision of detection of the air-fuel ratio of the measured gas deteriorates for a predetermined time. Further, the time for warmup control is extremely short, so the amount of Au evaporating from the third electrode 43 during warmup control is extremely small.

Therefore, in the present embodiment, the voltage control part 80a does not perform control suppressing evaporation and does not apply voltage to the pump cell 52 until the estimated temperature of the pump cell 52 first reaches the activation temperature or more due to warmup control even if the estimated temperature of the pump cell 52 is within the above predetermined temperature region. In other words, the voltage control part 80a performs control suppressing evaporation after the estimated temperature of the pump cell 52 first reaches the activation temperature or more due to warmup control. Due to this, it is possible to suppress a drop in the output of the sensor cell 51 due to evaporation of Au from the third electrode 43 after warmup control while quickly raising the precision of detection of the air-fuel ratio of the exhaust gas after the startup of the internal combustion engine 1. Note that, the voltage control part 80a may not perform control suppressing evaporation and may make the voltage applied to the pump cell 52 a voltage less than the starting voltage of decomposition of water until the estimated temperature of the pump cell 52 first reaches the activation temperature or more due to warmup control even if the estimated temperature of the pump cell 52 is within the above predetermined temperature region. The voltage less than the starting voltage of decomposition of water is for example a voltage within the limit current region of oxygen (for example 0.4V).

<Explanation of Control Using Time Chart>

Figure 8:
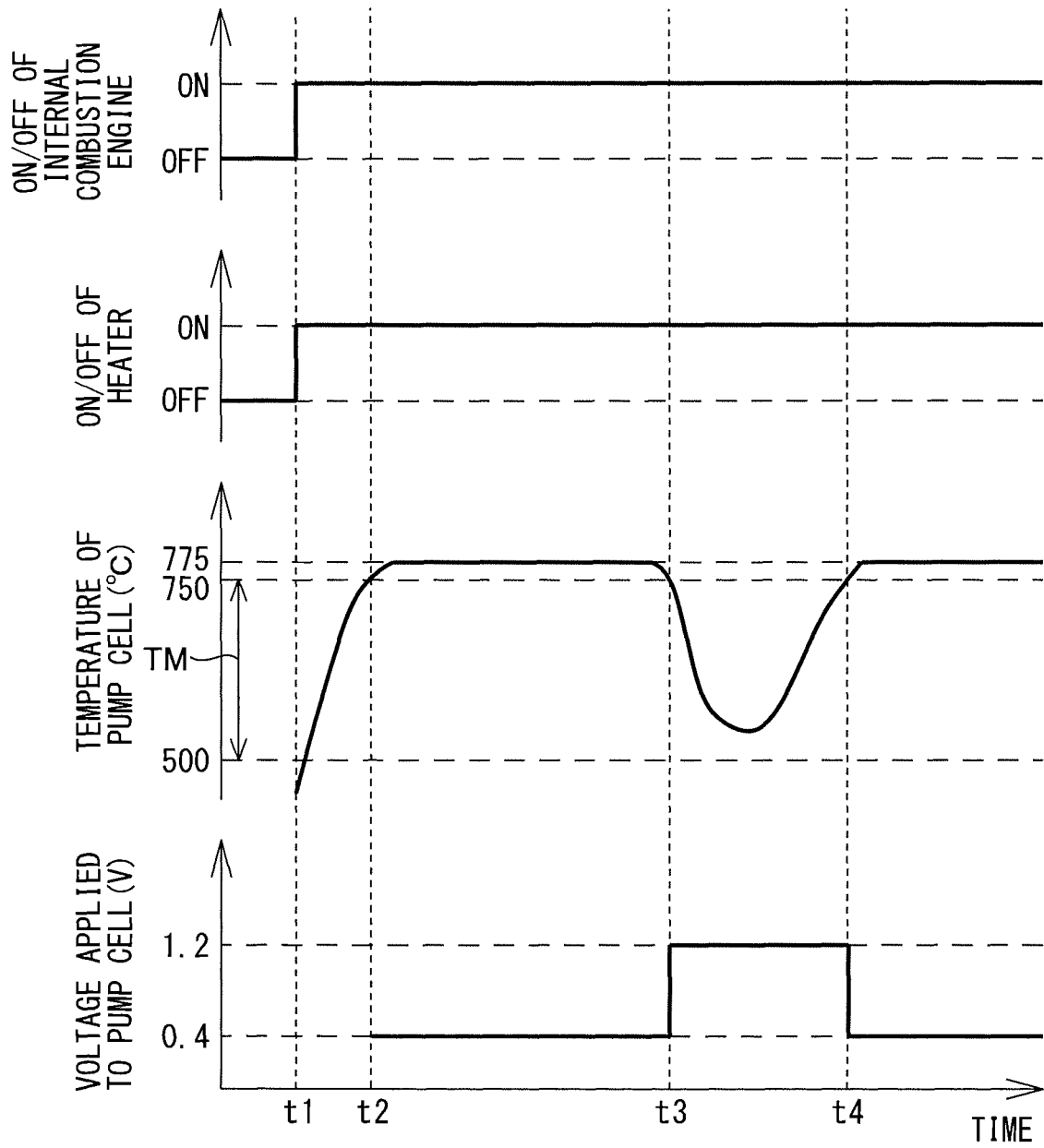
FIG. 8 is a schematic time chart of an on-off operation of an internal combustion engine etc. when performing the control in the first embodiment of the present invention.

Below, referring to the time chart of FIG. 8, control of the $NO_X$ sensor 10 will be specifically explained. FIG. 8 is a schematic time chart of the on/off operation of the internal combustion engine 1, the on/off operation of the heater 55, the temperature of the pump cell 52, and the voltage applied to the pump cell 52 when performing control in the first embodiment of the present invention. In the illustrated example, the temperature of the pump cell 52 is calculated based on the impedance of the pump cell 52.

In the illustrated example, the internal combustion engine 1 is started at the time t1. When the internal combustion engine 1 is started, to quickly activate the element part 10b of the $NO_X$ sensor 10, the heater 55 of the $NO_X$ sensor 10 is turned on. In the illustrated example, the target temperature of the pump cell 52 is set to 775° C. which is higher than the activation temperature of the pump cell 52 (for example 750° C.)

After the time t1, the temperature of the pump cell 52 gradually rises due to the heating by the heater 55 and reaches the activation temperature at the time t2.

For this reason, at the time t2, to detect the air-fuel ratio of the exhaust gas and the concentration of $NO_X$ in the exhaust gas, the voltage applied to the pump cell 52 is set to 0.4V. Note that, the temperature of the pump cell 52 passes through the medium temperature region TM from the time t1 to the time t2, but at this time, control suppressing evaporation is not performed and voltage is not applied to the pump cell 52.

In the illustrated example, at the time t3, the temperature of the pump cell 52 falls to less than the activation temperature. For this reason, at the time t3, to suppress evaporation of Au from the pump cell 52, the voltage applied to the pump cell 52 is switched from 0.4V to 1.2V.

After the time t3, the temperature of the pump cell 52 gradually falls, then rises toward the target temperature. The temperature of the pump cell 52 is maintained within the medium temperature region TM of 500° C. to less than 750° C. from the time t3 to the time t4. For this reason, from the time t3 to the time t4, the voltage applied to the pump cell 52 is maintained at 1.2V and control suppressing evaporation is performed.

At the time t4, the temperature of the pump cell 52 reaches the activation temperature or more. For this reason, at the time t4, the voltage applied to the pump cell 52 is switched from 1.2V to 0.4V. After that, the voltage applied to the pump cell 52 is maintained at 0.4V.

In the illustrated example, when the temperature of the pump cell 52 reaches the activation temperature, the voltage applied to the pump cell 52 is set to 0.4V. However, when the temperature of the pump cell 52 reaches the target temperature or when starting up the internal combustion engine 1, the voltage applied to the pump cell 52 may be set to 0.4V.

<Processing for Setting Applied Voltage>

Figure 9:
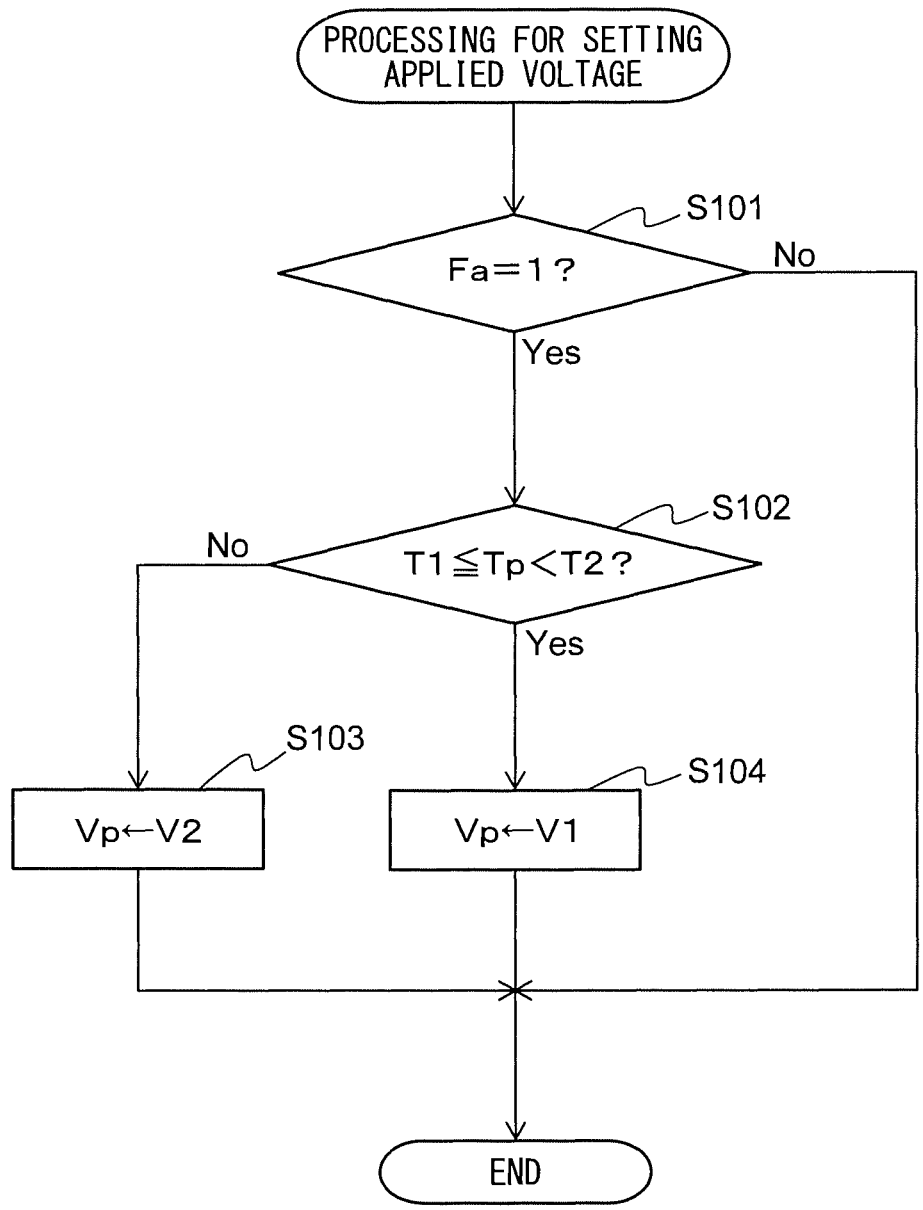
FIG. 9 is a flow chart showing a control routine for processing for setting applied voltage in the first embodiment of the present invention.

Below, referring to the flow chart of FIG. 9, control for setting the voltage applied to the pump cell 52 will be explained. FIG. 9 is a flow chart showing a control routine for processing for setting applied voltage in the first embodiment of the present invention. The present control routine is repeatedly performed after startup of the internal combustion engine 1 by the ECU 80 at predetermined time intervals.

First, at step S101, the voltage control part 80a judges whether the activation flag Fa is 1. The activation flag Fa is a flag set by the later explained processing for judging activation. The activation flag Fa is set to 1 when the temperature of the pump cell 52 first reaches the activation temperature or more after the startup of the internal combustion engine 1.

When at step S101 it is judged that the activation flag Fa is zero, the warmup control by the heater control part 80c has not ended, so the present control routine is ended. In this case, voltage is not applied to the pump cell 52. On the other hand, when at step S101 it is judged that the activation flag Fa is 1, that is, the warmup control by the heater control part 80c has ended, the present control routine proceeds to step S102.

At step S102, the temperature estimation part 80b judges whether the temperature Tp of the pump cell 52 is within a predetermined temperature region of less than the activation temperature of the pump cell 52. Specifically, the temperature estimation part 80b judges whether the temperature Tp of the pump cell 52 is a temperature of the first temperature T1 to less than the second temperature T2. The temperature Tp of the pump cell 52 is calculated based on the impedance of the pump cell 52. The first temperature T1 is the lower limit value of the temperature region where a predetermined amount or more of Au evaporates from the pump cell 52 and, for example, is 500° C. The second temperature T2 is a temperature of the activation temperature of the pump cell 52 or less and, for example, is the activation temperature (for example 750° C.)

When at step S102 it is judged that the temperature Tp of the pump cell 52 is not within a predetermined temperature region, the present control routine proceeds to step S103. At step S103, the voltage control part 80a sets the voltage applied to the pump cell 52 to the second voltage V2. The second voltage V2 is a voltage within the limit current region of oxygen and less than the starting voltage of decomposition of water, for example, 0.4V. After step S103, the present control routine is ended.

On the other hand, when at step S102 it is judged that the temperature Tp of the pump cell 52 is within a predetermined temperature region, the present control routine proceeds to step S104. At step S104, the voltage control part 80a sets the voltage applied to the pump cell 52 to the first voltage V1. That is, the voltage control part 80a performs control suppressing evaporation. The first voltage V1 is a voltage of the starting voltage of decomposition of water or more, for example, 1.2V. After step S104, the present control routine is ended.

Note that, when at step S101 it is judged that the activation flag Fa is zero, the voltage control part 80a may set the voltage applied to the pump cell 52 to the second voltage V2. Further, if setting the voltage applied to the pump cell 52 to the second voltage V2, the voltage control part 80a may perform feedback control on the voltage applied to the pump cell 52 based on the output of the monitor cell 53 so that the residual oxygen concentration becomes a predetermined low concentration.

Further, when the temperature Tp of the pump cell 52 is less than the first temperature T1, since the temperature Tp of the pump cell 52 is too low, it is difficult to detect the air-fuel ratio of the exhaust gas and the concentration of $NO_X$ in the exhaust gas. For this reason, when at step S102 it is judged that the temperature Tp of the pump cell 52 is less than the first temperature T1, the voltage control part 80a may make the application of voltage to the pump cell 52 stop.

<Processing for Judging Activation>

Figure 10:
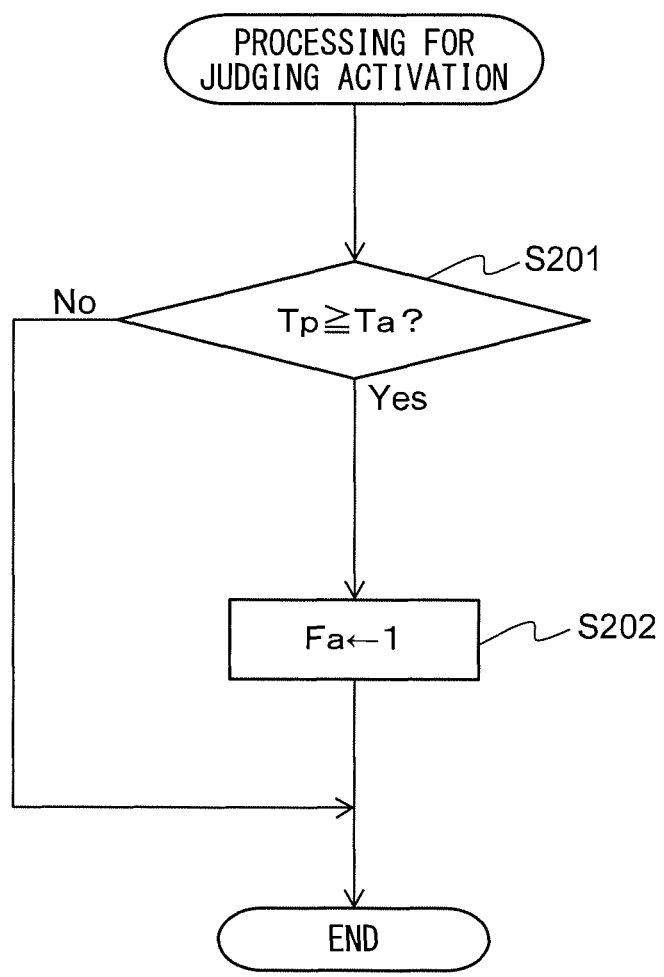
FIG. 10 is a flow chart showing a control routine for processing for judging activation in the first embodiment of the present invention.

FIG. 10 is a flow chart showing a control routine for processing for judging activation in the first embodiment of the present invention. The illustrated control routine is repeatedly performed after the startup of the internal combustion engine 1 by the ECU 80 at predetermined time intervals.

First, at step S201, the temperature estimation part 80b judges whether the temperature Tp of the pump cell 52 is the activation temperature Ta of the pump cell 52 or more. The temperature Tp of the pump cell 52 is calculated based on the impedance of the pump cell 52. The activation temperature Ta is for example 750° C.

When at step S201 it is judged that the temperature Tp of the pump cell 52 is less than the activation temperature Ta, the present control routine is ended. On the other hand, when at step S201 it is judged that the temperature Tp of the pump cell 52 is Ta or more, the present control routine proceeds to step S202.

At step S202, the temperature estimation part 80b sets the activation flag Fa to 1. Further, the activation flag Fa is reset and made zero at the time of startup of the internal combustion engine 1. After step S202, the present control routine is ended.

Second Embodiment

The control device of an $NO_X$ sensor according to the second embodiment is basically similar in configuration and control to the control device of an $NO_X$ sensor according to the first embodiment except for the points explained below. For this reason, below, the second embodiment of the present invention will be explained focusing on the parts different from the first embodiment.

Figure 11:
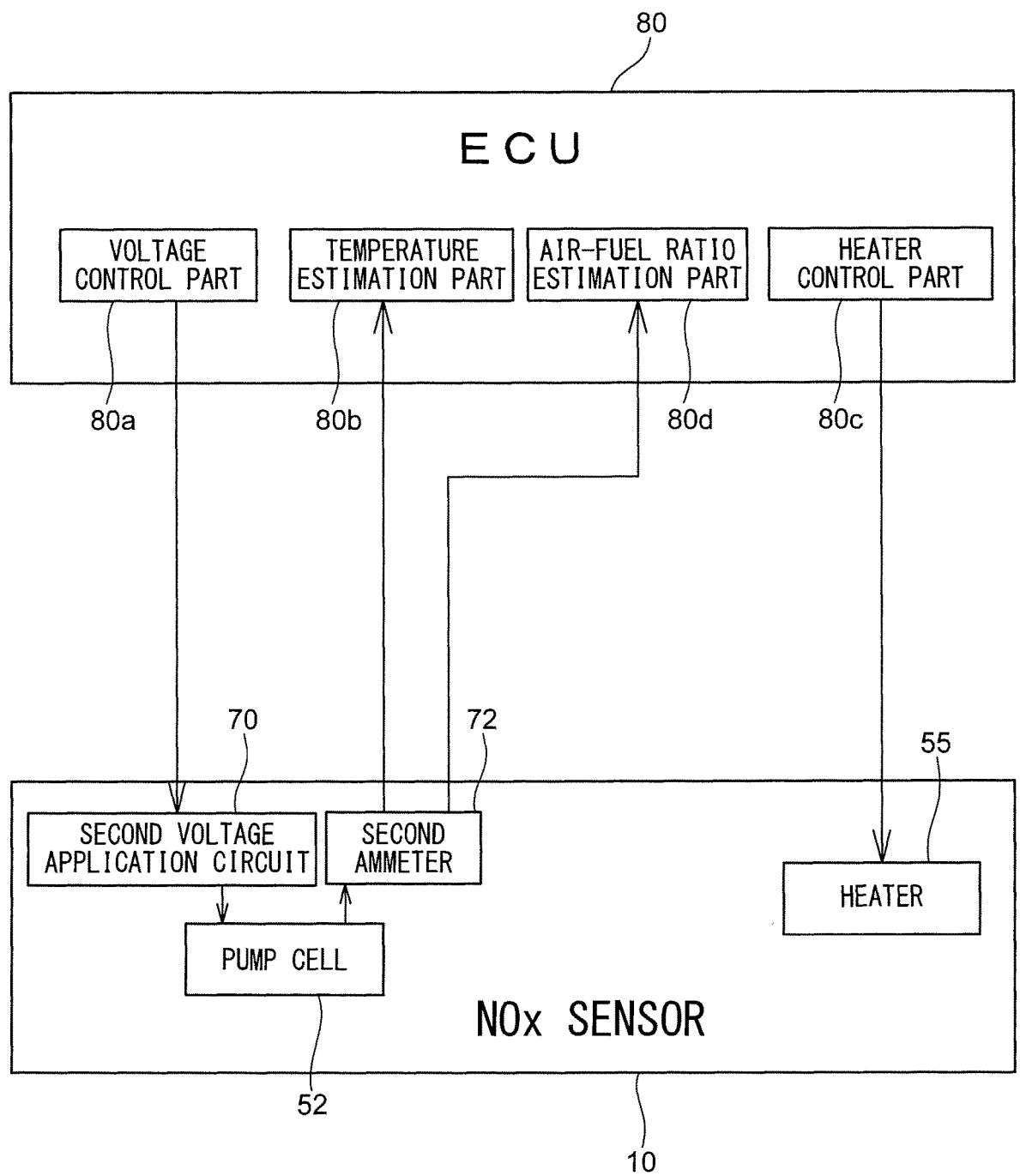
FIG. 11 is a block diagram schematically showing the configuration of a control device of an $NO_X$ sensor and the configuration of an $NO_X$ sensor according to a second embodiment of the present invention.

FIG. 11 is a block diagram schematically showing the configuration of the control device of an $NO_X$ sensor and the configuration of $NO_X$ sensor according to the second embodiment of the present invention. In the second embodiment, the control device of the $NO_X$ sensor 10 is further provided with an air-fuel ratio estimation part 80d. In the present embodiment, the air-fuel ratio estimation part 80d is part of the ECU 80. The air-fuel ratio estimation part 80d estimates the air-fuel ratio of the measured gas (exhaust gas). The air-fuel ratio estimation part 80d, for example, estimates the air-fuel ratio of the measured gas based on the output of the pump cell 52. Note that, when an air-fuel ratio sensor is provided in the exhaust passage near the $NO_X$ sensor 10, the air-fuel ratio estimation part 80*d* may estimate the air-fuel ratio of the measured gas based on the output of this air-fuel ratio sensor.

As will be understood from FIG. 5, when the air-fuel ratio of the measured gas is leaner than the stoichiometric air-fuel ratio, Au evaporates from the pump cell 52. For this reason, in the second embodiment, the voltage control part 80*a* starts control suppressing evaporation when the estimated temperature of the pump cell 52 is within a predetermined temperature region and the air-fuel ratio of the measured gas estimated by the air-fuel ratio estimation part 80*d* is leaner than the stoichiometric air-fuel ratio. By doing this, it is possible to reduce the number of times the control suppressing evaporation is performed, so it is possible to reduce the power consumption of the $NO_X$ sensor 10.

Further, if control suppressing evaporation is performed, the output of the pump cell 52 changes in accordance with not only the concentration of oxygen in the measured gas, but also the concentration of water in the measured gas. For this reason, when the air-fuel ratio estimation part 80*d* estimates the air-fuel ratio of the measured gas based on the output of the pump cell 52, it is difficult to detect the air-fuel ratio of the measured gas during control suppressing evaporation. Therefore, if estimating the air-fuel ratio of the measured gas based on the output of the pump cell 52, the air-fuel ratio estimation part 80*d* ends the control suppressing evaporation when the estimated temperature of the pump cell 52 reaches a temperature outside the predetermined temperature region.

Note that, if estimating the air-fuel ratio of the measured gas based on the output of an air-fuel ratio sensor separate from the $NO_X$ sensor 10, the air-fuel ratio estimation part 80*d* may make the control suppressing evaporation end when the estimated temperature of the pump cell 52 reaches a temperature outside the above predetermined temperature region or when the air-fuel ratio of the measured gas becomes the stoichiometric air-fuel ratio or less. That is, the voltage control part 80*a* may perform control suppressing evaporation when the estimated temperature of the pump cell 52 is within the predetermined temperature region and the air-fuel ratio of the measured gas estimated by the air-fuel ratio estimation part 80*d* is leaner than the stoichiometric air-fuel ratio.

<Processing for Setting Applied Voltage>

Figure 12:
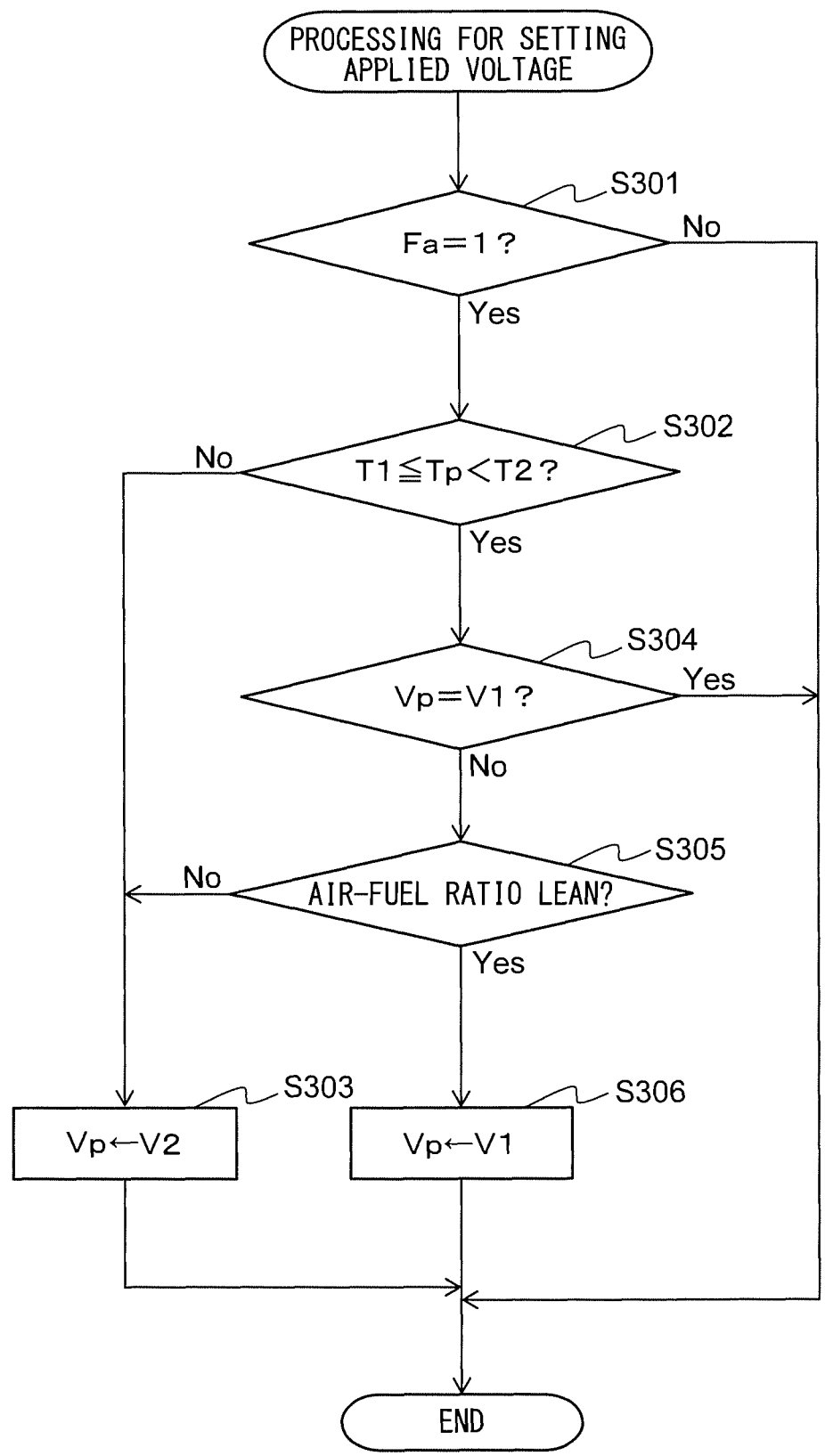
FIG. 12 is a flow chart showing a control routine for processing for setting applied voltage in the second embodiment of the present invention.

FIG. 12 is a flow chart showing a control routine for processing for setting applied voltage in a second embodiment of the present invention. The present control routine is repeatedly performed after startup of the internal combustion engine 1 by the ECU 80 at predetermined time intervals. Step S301 and step S302 in FIG. 12 are similar to step S101 and step S102 in FIG. 9, so explanations will be omitted.

When at step S302 it is judged that the temperature Tp of the pump cell 52 is within a predetermined temperature region, the present control routine proceeds to step S304. At step S304, the voltage control part 80*a* judges whether the voltage Vp applied to the pump cell 52 is the first voltage V1. The first voltage V1 is for example 1.2V.

When at step S304 it is judged that the voltage Vp applied to the pump cell 52 is not the first voltage V1, the present control routine proceeds to step S305. At step S305, the air-fuel ratio estimation part 80*d* judges whether the air-fuel ratio of the measured gas is leaner than the stoichiometric air-fuel ratio.

When at step S305 it is judged that the air-fuel ratio of the measured gas is the stoichiometric air-fuel ratio or less, the present control routine proceeds to step S303. At step S303, the voltage control part 80*a* sets the voltage applied to the pump cell 52 to the second voltage V2. The second voltage V2 is for example 0.4V. After step S303, the present control routine is ended.

On the other hand, when at step S305 it is judged that the air-fuel ratio of the measured gas is leaner than the stoichiometric air-fuel ratio, the present control routine proceeds to step S306. At step S306, the voltage control part 80*a* sets the voltage applied to the pump cell 52 to the first voltage V1. That is, the voltage control part 80*a* performs control suppressing evaporation. After step S306, the present control routine is ended.

Further, when at step S304 it is judged that the voltage Vp applied to the pump cell 52 is the first voltage V1, the present control routine is ended. That is, the applied voltage Vp is maintained at the first voltage V1 and the control suppressing evaporation is continued.

Note that, if the air-fuel ratio estimation part 80*d* estimates the air-fuel ratio of the measured gas based on the output of an air-fuel ratio sensor separate from the $NO_X$ sensor 10, step S304 may be omitted. In this case, the voltage control part 80*a* ends the control suppressing evaporation when the air-fuel ratio of the measured gas becomes the stoichiometric air-fuel ratio or less during the control suppressing evaporation.

Further, in the same way as the first embodiment, when at step S302 it is judged that the temperature Tp of the pump cell 52 is less than the first temperature T1, the voltage control part 80*a* may make the application of voltage to the pump cell 52 stop. Further, when at step S301 it is judged that the activation flag Fa is zero, the voltage control part 80*a* may set the voltage applied to the pump cell 52 to the second voltage V2. Further, if setting the voltage applied to the pump cell 52 to the second voltage V2, the voltage control part 80*a* may perform feedback control on the voltage applied to the pump cell 52 based on the output of the monitor cell 53 so that the residual oxygen concentration becomes a predetermined low concentration.

Third Embodiment

The control device of an $NO_X$ sensor according to the third embodiment is basically similar in configuration and control to the control device of an $NO_X$ sensor according to the first embodiment except for the points explained below. For this reason, below, the third embodiment of the present invention will be explained focusing on the parts different from the first embodiment.

As explained above, if control suppressing evaporation is performed, the precision of detection of the air-fuel ratio of the measured gas by the pump cell 52 falls. Further, due to the effects of the hydrogen produced in the pump cell 52, the precision of detection of the concentration of $NO_X$ in the measured gas by the sensor cell 51 also falls.

In this regard, in the internal combustion engine 1, at the time of stopping the supply of fuel to the combustion chamber 2 as fuel cut control, air flows into the exhaust passage. For this reason, during fuel cut control, there is little need for detecting the air-fuel ratio and $NO_X$ concentration for suppressing deterioration of the exhaust emission. Further, when the internal combustion engine 1 is being idled, the air-fuel ratio of the exhaust gas tends to stabilize. For this reason, during idling, there is little need for detecting the air-fuel ratio and $NO_X$ concentration so as to suppress deterioration of the exhaust emission. Note that, "idling" means the operating state where the degree of opening of the accelerator pedal is zero and combustion of the air-fuel mixture in the combustion chamber 2 enables the engine speed to be maintained at a predetermined low speed (for example 400 to 800 rpm).

Therefore, in the third embodiment, the voltage control part 80a performs control suppressing evaporation at the time of fuel cut control or idling at the internal combustion engine 1. Due to this, it is possible to suppress the drop in the output of the sensor cell 51 due to evaporation of Au from the pump cell 52 while suppressing deterioration of the exhaust emission during the control suppressing evaporation.

<Processing for Setting Applied Voltage>

Figure 13:
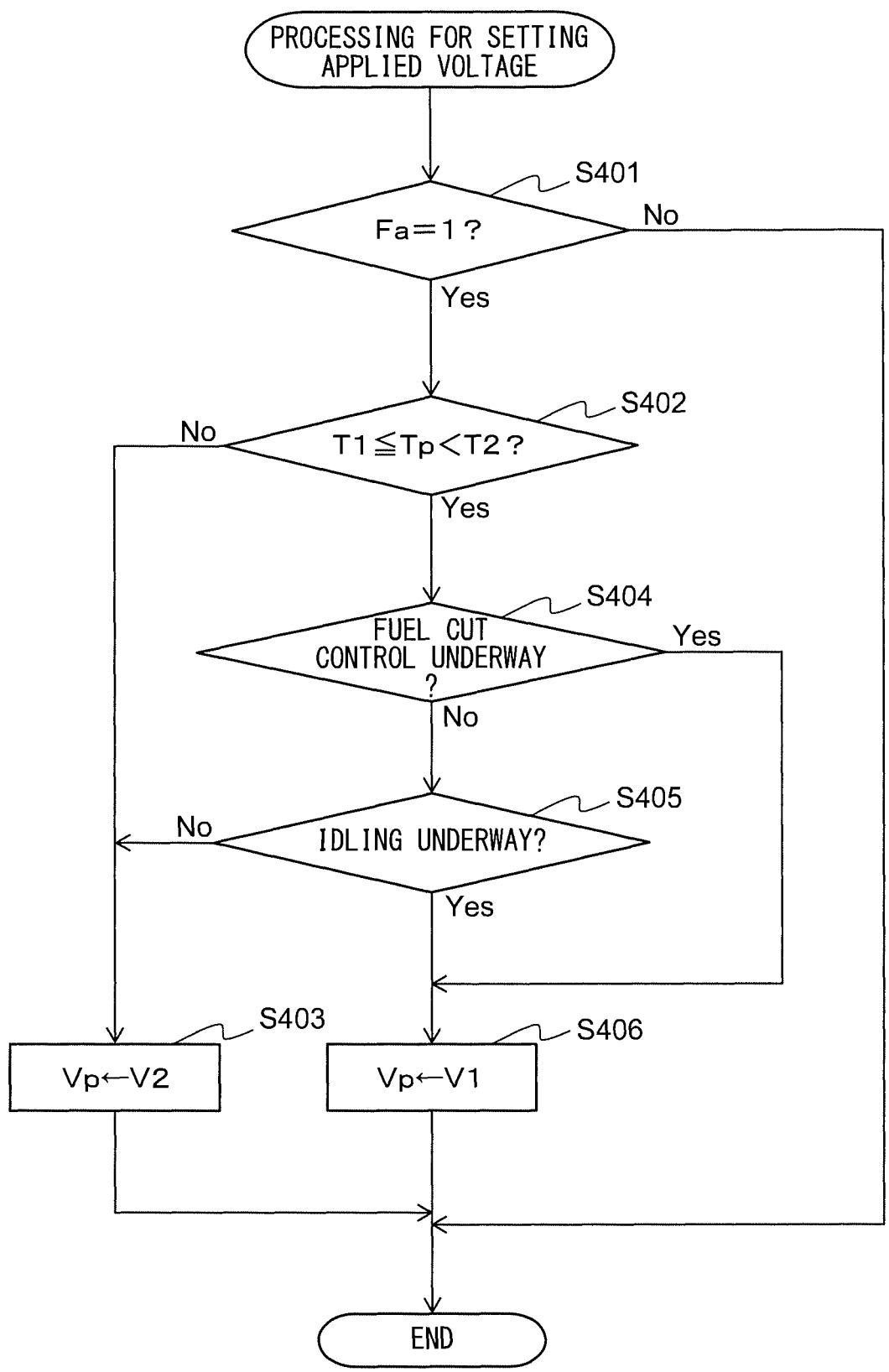
FIG. 13 is a flow chart showing a control routine for processing for setting applied voltage in a third embodiment of the present invention.

FIG. 13 is a flow chart showing a control routine for processing for setting applied voltage in a third embodiment of the present invention. The present control routine is repeatedly performed after startup of the internal combustion engine 1 by the ECU 80 at predetermined time intervals. Step S401 and step S402 in FIG. 13 are similar to step S101 and step S102 in FIG. 9, so explanations will be omitted.

When at step S402 it is judged that the temperature Tp of the pump cell 52 is within a predetermined temperature region, the present control routine proceeds to step S404. At step S404, the voltage control part 80a judges whether fuel cut control is being performed in the internal combustion engine 1.

When it is judged at step S404 that fuel cut control is not being performed, the present control routine proceeds to step S405. At step S405, the voltage control part 80a judges whether the internal combustion engine 1 is being idled.

When at step S405 it is judged that the engine is not being idled, the present control routine proceeds to step S403. At step S403, the voltage control part 80a sets the voltage applied to the pump cell 52 to the second voltage V2. The second voltage V2 is for example 0.4V. After step S403, the present control routine is ended.

On the other hand, when it is judged at step S404 that the fuel cut control is being performed or when it is judged at step S405 that the internal combustion engine 1 is being idled, the present control routine proceeds to step S406. At step S406, the voltage control part 80a sets the voltage applied to the pump cell 52 to the first voltage V1. That is, the voltage control part 80a performs control suppressing evaporation. The first voltage V1 is for example 1.2V. After step S406, the present control routine is ended.

Note that, in the same way as the first embodiment, when at step S402 it is judged that the temperature Tp of the pump cell 52 is less than the first temperature T1, the voltage control part 80a may make the application of voltage to the pump cell 52 stop. Further, when at step S401 it is judged that the activation flag Fa is zero, the voltage control part 80a may set the voltage applied to the pump cell 52 to the second voltage V2. Further, if setting the voltage applied to the pump cell 52 to the second voltage V2, the voltage control part 80a may perform feedback control on the voltage applied to the pump cell 52 based on the output of the monitor cell 53 so that the residual oxygen concentration becomes a predetermined low concentration.

Fourth Embodiment

The control device of an $NO_X$ sensor according to the fourth embodiment is basically similar in configuration and control to the control device of an $NO_X$ sensor according to the first embodiment except for the points explained below. For this reason, below, the fourth embodiment of the present invention will be explained focusing on the parts different from the first embodiment.

After stopping the internal combustion engine 1, it is not necessary to detect the concentration of $NO_X$ in the exhaust gas, so usually if stopping of the internal combustion engine 1 is requested, the heater 55 of the $NO_X$ sensor 10 is turned off together with the internal combustion engine 1 being stopped. If the heater 55 is turned off, the temperature of the pump cell 52 gradually falls from the temperature of the activation temperature or more and passes the medium temperature region TM.

Therefore, in the fourth embodiment, the voltage control part 80a performs control suppressing evaporation after stopping of the internal combustion engine 1 is requested. Further, the voltage control part makes the application of voltage to the pump cell 52 end when the estimated temperature of the pump cell 52 reaches a temperature less than the predetermined temperature region. By doing this, a drop in the output of the sensor cell 51 due to the evaporation of Au from the pump cell 52 after the internal combustion engine 1 is stopped can be suppressed.

Note that, a request for stopping the internal combustion engine 1 is, for example, issued when the ignition switch of the vehicle mounting the internal combustion engine 1 is turned off. Further, when the vehicle mounting the internal combustion engine 1 is a hybrid vehicle, a request for stopping the internal combustion engine 1 is also issued when the drive source of the vehicle is switched from the internal combustion engine 1 to the electric motor.

<Processing for Setting Applied Voltage>

Figure 14:
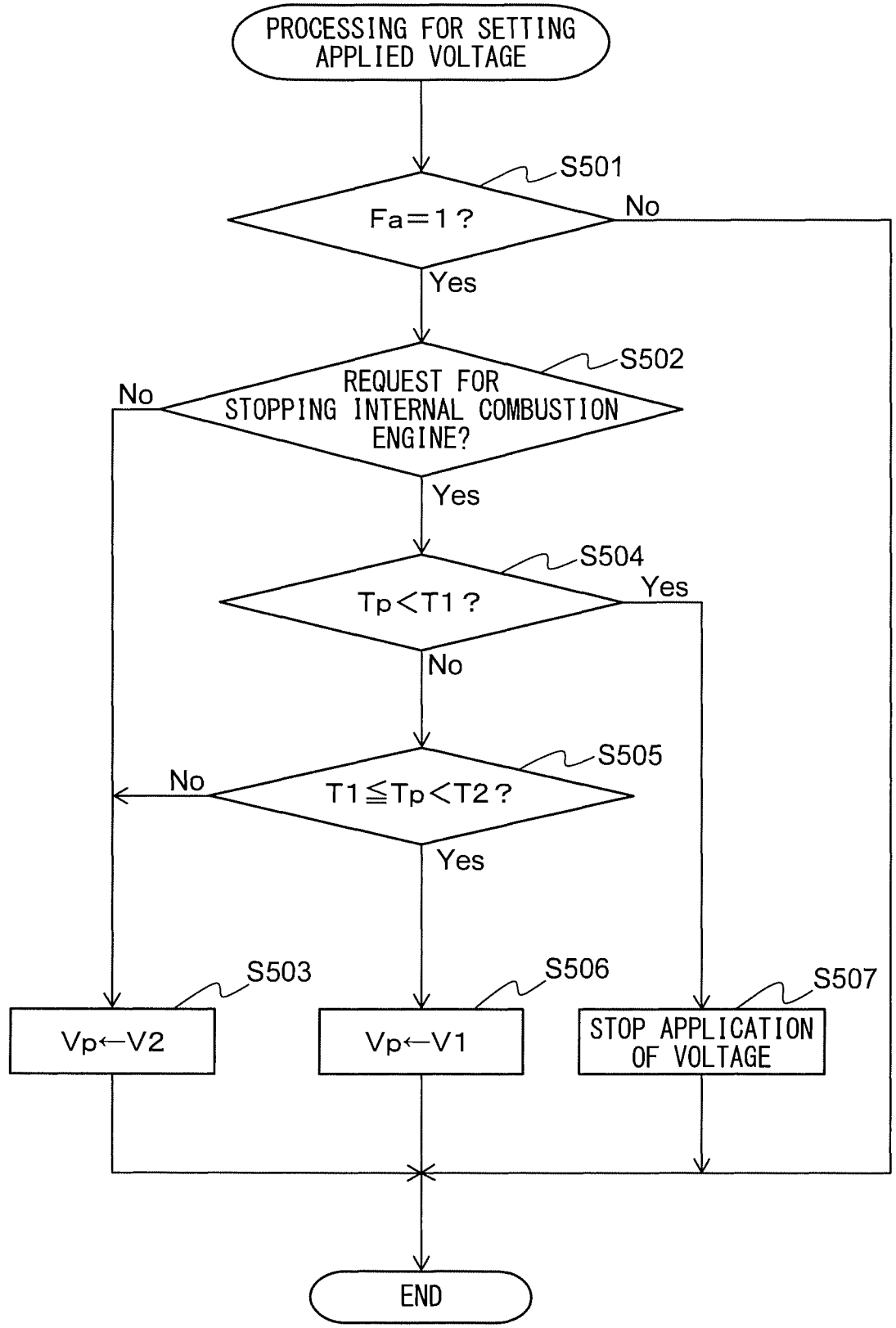
FIG. 14 is a flow chart showing a control routine for processing for setting applied voltage in a fourth embodiment of the present invention.

FIG. 14 is a flow chart showing a control routine for processing for setting an applied voltage in the fourth embodiment of the present invention. The present control routine is repeatedly executed after startup of the internal combustion engine 1 by the ECU 80 at predetermined time intervals. Step S501 in FIG. 14 is similar to step S101 in FIG. 9, so the explanation will be omitted.

When at step S501 it is judged that the activation flag Fa is 1, the present control routine proceeds to step S502. At step S502, the voltage control part 80 judges whether there is a request for stopping the internal combustion engine 1.

When at step S502 it is judged that there has been no request for stopping the internal combustion engine 1, the present control routine proceeds to step S503. At step S503, the voltage control part 80a sets the voltage applied to the pump cell 52 at the second voltage V2. The second voltage V2 is for example 0.4V. After step S503, the present control routine is ended.

On the other hand, when at step S502 it is judged that there is a request for stopping the internal combustion engine 1, the present control routine proceeds to step S504. At step S504, the temperature estimation part 80b judges whether the temperature Tp of the pump cell 52 is less than a first temperature T1. The first temperature T1 is a lower limit value of the temperature region where a predetermined amount or more of Au evaporates from the pump cell 52 and, for example, is 500° C.

When at step S504 it is judged that the temperature Tp of the pump cell 52 is the first temperature T1 or more, the present control routine proceeds to step S505. Step S505 is similar to step S102 of FIG. 9. At step S505, the temperature estimation part 80b judges whether the temperature Tp of the pump cell 52 is within a predetermined temperature region of less than the activation temperature of the pump cell 52.

When at step S505 it is judged that the temperature Tp of the pump cell 52 is not within the predetermined temperature region, that is, when it is judged that the temperature Tp of the pump cell 52 is T2 or more, the present control routine proceeds to step S503. At step S503, the voltage control part 80a sets the voltage applied to the pump cell 52 to the second voltage V2. The second voltage V2 is for example 0.4V. After step S503, the present control routine is ended.

On the other hand, when at step S505 it is judged that the temperature Tp of the pump cell 52 is within a predetermined temperature region, the present control routine proceeds to step S506. At step S506, the voltage control part 80a sets the voltage applied to the pump cell 52 to the first voltage V1. That is, the voltage control part 80a performs control suppressing evaporation. The first voltage V1 is for example 1.2V. After step S506, the present control routine is ended.

Further, when at step S504 it is judged that the temperature Tp of the pump cell 52 is less than the first temperature T1, the present control routine proceeds to step S507. At step S507, the voltage control part 80a stops the application of voltage to the pump cell 52. After step S507, the present control routine is ended. Note that, if a request for stopping the internal combustion engine 1 is issued, it is judged that there is a request for stopping the internal combustion engine 1 from when stopping of the internal combustion engine 1 is requested to when the application of voltage to the pump cell 52 is stopped at step S507.

Note that, in the same way as the first embodiment, when at step S501 it is judged that the activation flag Fa is zero, the voltage control part 80a may set the voltage applied to the pump cell 52 to the second voltage V2. Further, if setting the voltage applied to the pump cell 52 to the second voltage V2, the voltage control part 80a may perform feedback control on the voltage applied to the pump cell 52 based on the output of the monitor cell 53 so that the residual oxygen concentration becomes a predetermined low concentration.

Above, preferred embodiments according to the present invention were explained, but the present invention is not limited to these embodiments and can be modified and changed in various ways within the language of the claims. For example, control for suppressing evaporation may be performed during warmup control by the heater control part as well. Further, the above-mentioned embodiments can be combined in any way. For example, step S304 and step S305 in FIG. 12 may be performed between step S402 and step S404 in FIG. 13 or between step S505 and step S506 in FIG. 14.

REFERENCE SIGNS LIST 1. internal combustion engine
10. NO$_x$ sensor
10b. element part
11. first solid electrolyte layer
12. second solid electrolyte layer
30. measured gas chamber
41. first electrode
42. second electrode
43. third electrode
44. fourth electrode
51. sensor cell
52. pump cell
55. heater
80. electronic control unit (ECU)
80a. voltage control part
80b. temperature estimation part
80c. heater control part
80d. air-fuel ratio estimation part

The invention claimed is:

1. A control device of a nitrogen oxide sensor controlling a nitrogen oxide sensor arranged in an exhaust passage of an internal combustion engine and detecting a concentration of nitrogen oxide in exhaust gas, wherein:
the nitrogen oxide sensor comprises:
a measured gas chamber in which the exhaust gas is introduced as measured gas,
a sensor cell having a sensor-use solid electrolyte layer having an oxide ion conductivity, a first electrode arranged on one side surface of the sensor-use solid electrolyte layer so as to be exposed to the measured gas, and a second electrode arranged at the other side surface of the sensor-use solid electrolyte layer so as to be exposed to a reference gas,
a pump cell having a pump-use solid electrolyte layer having an oxide ion conductivity, a third electrode arranged at one side surface of the pump-use solid electrolyte layer so as to be exposed to the measured gas and comprised of a platinum-gold alloy, and a fourth electrode arranged at the other side surface of the pump-use solid electrolyte layer so as to be exposed to the reference gas, and arranged at an upstream side from the sensor cell in a direction of flow of the measured gas,
a voltage application circuit applying voltage to the pump cell so that a potential of the fourth electrode becomes higher than a potential of the third electrode, and
a heater heating the sensor cell and the pump cell,
the control device comprises an electronic control unit (ECU) including a processor for executing programs stored in memory, the ECU configured to:
control voltage applied to the pump cell,
estimate a temperature of the pump cell, and
control the heater and raise the temperature of the pump cell to an activation temperature or more after startup of the internal combustion engine as warmup control,
wherein the ECU is further configured to:
make the voltage applied to the pump cell a voltage of a starting voltage of decomposition of water or more when the estimated temperature of the pump cell is within a predetermined temperature region of less than the activation temperature of the pump cell as control suppressing evaporation, and
when the warmup control is performed, make the voltage applied to the pump cell a voltage less than the starting voltage of decomposition of water or not to apply voltage to the pump cell until the warmup control causes the estimated temperature of the pump cell to first reach the activation temperature or more.

2. The control device of a nitrogen oxide sensor according to claim 1, wherein the ECU is further configured to make the voltage applied to the pump cell a voltage of within a limit current region of oxygen and less than the starting voltage of decomposition of water when the estimated temperature of the pump cell is the activation temperature or more.

3. The control device of a nitrogen oxide sensor according to claim 1, wherein
the ECU is further configured to estimate the air-fuel ratio of the measured gas, and
the ECU is further configured to start the control suppressing evaporation when the estimated temperature of the pump cell is within the predetermined temperature region and the air-fuel ratio of the measured gas is leaner than a stoichiometric air-fuel ratio.

4. The control device of a nitrogen oxide sensor according to claim 2, wherein
the ECU is further configured to estimate the air-fuel ratio of the measured gas, and
the ECU is further configured to start the control suppressing evaporation when the estimated temperature of the pump cell is within the predetermined temperature region and the air-fuel ratio of the measured gas is leaner than a stoichiometric air-fuel ratio.

5. The control device of a nitrogen oxide sensor according to claim 3, wherein the ECU is further configured to estimate the air-fuel ratio of the measured gas based on an output of the pump cell, and the ECU is further configured to end the control suppressing evaporation when the estimated temperature of the pump cell reaches a temperature outside the predetermined temperature region.

6. The control device of a nitrogen oxide sensor according to claim 4, wherein the ECU is further configured to estimate the air-fuel ratio of the measured gas based on an output of the pump cell, and the ECU is further is configured to end the control suppressing evaporation when the estimated temperature of the pump cell reaches a temperature outside the predetermined temperature region.

7. The control device of a nitrogen oxide sensor according to claim 1, wherein the ECU is further configured to perform the control suppressing evaporation when in the internal combustion engine, supply of fuel to a combustion chamber is stopped as fuel cut control or the engine is idling.

8. The control device of a nitrogen oxide sensor according to claim 1, wherein the ECU is further configured to perform the control suppressing evaporation after stopping of the internal combustion engine is requested.

9. The control device of a nitrogen oxide sensor according to claim 8, wherein the ECU is further configured to end the application of voltage to the pump cell when the estimated temperature of the pump cell reaches a temperature less than the predetermined temperature region.

* * * * *